United States Patent
Thyamagondlu et al.

(10) Patent No.: US 12,259,833 B2
(45) Date of Patent: Mar. 25, 2025

(54) DESCRIPTOR FETCHING FOR A MULTI-QUEUE DIRECT MEMORY ACCESS SYSTEM

(71) Applicant: Xilinx, Inc., San Jose, CA (US)

(72) Inventors: Chandrasekhar S. Thyamagondlu, Saratoga, CA (US); Tao Yu, Campbell, CA (US); Chiranjeevi Sirandas, Sunnyvale, CA (US); Nicholas Trank, San Francisco, CA (US)

(73) Assignee: XILINX, INC., San Jose, CA (US)

( * ) Notice: Subject to any disclaimer, the term of this patent is extended or adjusted under 35 U.S.C. 154(b) by 73 days.

(21) Appl. No.: 18/191,365

(22) Filed: Mar. 28, 2023

(65) Prior Publication Data

US 2024/0330215 A1 Oct. 3, 2024

(51) Int. Cl.
G06F 13/28 (2006.01)

(52) U.S. Cl.
CPC .................... *G06F 13/28* (2013.01)

(58) Field of Classification Search
CPC ................................................ G06F 13/28–34
USPC ...................................................... 710/22–28
See application file for complete search history.

(56) References Cited

U.S. PATENT DOCUMENTS

| 6,701,393 | B1 | 3/2004 | Kemeny |
| 7,047,362 | B2 | 5/2006 | Kim |
| 7,577,773 | B1 | 8/2009 | Gandhi |
| 9,292,436 | B2 | 3/2016 | Wingard |
| 9,952,991 | B1 * | 4/2018 | Bruce ..................... G06F 13/28 |
| 10,474,610 | B1 | 11/2019 | Schelle |
| 10,983,920 | B2 | 4/2021 | Thyamagondlu et al. |
| 11,232,053 | B1 | 1/2022 | Thyamagondlu et al. |
| 11,500,779 | B1 | 11/2022 | Mukherjee |
| 11,983,128 | B1 * | 5/2024 | Xu ........................... G06F 13/28 |
| 2003/0131198 | A1 * | 7/2003 | Wolrich .............. H04L 49/9047 |
| | | | 711/108 |
| 2006/0173970 | A1 * | 8/2006 | Pope ....................... G06F 13/28 |
| | | | 709/216 |
| 2008/0168259 | A1 | 7/2008 | Biran |
| 2011/0219208 | A1 | 9/2011 | Asaad |
| 2012/0254499 | A1 * | 10/2012 | Hashimoto ............. G06F 9/445 |
| | | | 711/E12.007 |
| 2014/0181410 | A1 | 6/2014 | Kalamatianos |
| 2014/0195788 | A1 | 7/2014 | Kalogeropulos |
| 2014/0317357 | A1 | 10/2014 | Kaplan |
| 2014/0344485 | A1 | 11/2014 | Dondini |
| 2015/0180782 | A1 | 6/2015 | Rimmer |
| 2015/0347292 | A1 | 12/2015 | Fujita |
| 2016/0173398 | A1 | 6/2016 | Reinig |
| 2016/0292100 | A1 | 10/2016 | Olcay |
| 2017/0131904 | A1 | 5/2017 | Rajwade |
| 2021/0014177 | A1 | 1/2021 | Kasichainula |

(Continued)

*Primary Examiner* — Ilwoo Park
(74) *Attorney, Agent, or Firm* — Kevin T. Cuenot

(57) ABSTRACT

Descriptor fetch for a direct memory access system includes obtaining a descriptor for processing a received data packet. A determination is made as to whether the descriptor is a head descriptor of a chain descriptor. In response to determining that the descriptor is a head descriptor, one or more tail descriptors are fetched from a descriptor table specified by the head descriptor. A number of the tail descriptors fetched is determined based on a running count of a buffer size of the chain descriptor determined as each tail descriptor is fetched compared to a size of the data packet.

20 Claims, 16 Drawing Sheets

(56) References Cited

U.S. PATENT DOCUMENTS

| | | |
|---|---|---|
| 2021/0117360 A1 | 4/2021 | Kutch |
| 2021/0303570 A1 | 9/2021 | Kodiles |
| 2022/0005521 A1 | 1/2022 | Sethuraman |
| 2022/0374150 A1 | 11/2022 | Capri |
| 2023/0185745 A1 | 6/2023 | Wu |
| 2023/0298128 A1 | 9/2023 | Puffer |
| 2024/0086356 A1 | 3/2024 | Ray |
| 2024/0118702 A1 | 4/2024 | Cella |
| 2024/0330191 A1 | 10/2024 | Thyamagondlu et al. |
| 2024/0330213 A1 | 10/2024 | Thyamagondlu et al. |
| 2024/0330216 A1 | 10/2024 | Thyamagondlu et al. |
| 2025/0004961 A1 | 1/2025 | Thyamagondlu |

\* cited by examiner

700

---

Reading, by the direct memory access system of a peripheral device, a plurality of pointers from an index ring buffer of a host memory, wherein the plurality of pointers specify a plurality of descriptors of a descriptor table stored in the host memory
702

Determine whether the plurality of descriptors are stored in the descriptor table with incremental index locations
704

In response to determining that the plurality of descriptors are stored in the descriptor table with incremental index locations, generate a single read request specifying the plurality of descriptors
706

Issue the single read request, as coalesced, to the host system to fetch the plurality of descriptors
708

In response to receiving a first data packet, fetching a plurality of descriptors including a first descriptor and a specified number of prefetched descriptors
802

In response to processing each data packet, selectively replenishing the plurality of fetched descriptors to the specified number of prefetched descriptors.
804

DESCRIPTOR FETCHING FOR A MULTI-QUEUE DIRECT MEMORY ACCESS SYSTEM

TECHNICAL FIELD

This disclosure relates to integrated circuits (ICs) and, more particularly, to descriptor fetching for a multi-queue direct memory access system.

BACKGROUND

Many modern computing environments include one or more host data processing systems (host systems) coupled to one or more peripheral devices. An example of a peripheral device is a hardware accelerator. The host system(s) may offload tasks to be performed by the peripheral devices. A peripheral device may include one or more compute units. To facilitate data movement between the host system(s) and the compute units of a peripheral device, the peripheral device may include a Multi-Queue Direct Memory Access (MQ-DMA) system. The MQ-DMA system provides non-blocking data movement between memory of the host system(s) that corresponds to different processes, functions, and/or applications executing therein and the compute units of the peripheral device.

In the usual case, the MQ-DMA system uses a descriptor queue for tracking certain DMA operations. Descriptor queues reside in memory of the host system(s). As such, descriptors must be fetched by the MQ-DMA system from the descriptor queues for use. With the descriptor queues residing in host memory, descriptor fetch operations can take significant time resulting in increased system latency and reduced bandwidth. With this in mind, descriptor fetch operations are an important aspect of efficient MQ-DMA system operation.

SUMMARY

One or more example implementations are directed to a method of descriptor fetch for a direct memory access system. The method includes obtaining a descriptor for processing a received data packet. The method includes determining whether the descriptor is a head descriptor of a chain descriptor. The method includes, in response to determining that the descriptor is a head descriptor, fetching one or more tail descriptors from a descriptor table specified by the head descriptor. The method includes determining a number of the tail descriptors fetched based on a running count of a buffer size of the chain descriptor determined as each tail descriptor is fetched compared to a size of the data packet.

The foregoing and other implementations can each optionally include one or more of the following features, alone or in combination. Some example implementations include all the following features in combination.

In some aspects, the method includes, in response to each tail descriptor fetched, determining whether the running count of the buffer size of the chain descriptor satisfies the size of the data packet. In response to determining that the running count of the buffer size of the chain descriptor including a most recently fetched tail descriptor does satisfy the size of the data packet, discontinuing fetching of the tail descriptors from the descriptor table.

In some aspects, the method includes, in response to each tail descriptor fetched, determining whether the running count of the buffer size of the chain descriptor satisfies the size of the data packet. In response to determining that the running count of the buffer size of the chain descriptor including a most recently fetched tail descriptor does not satisfy the size of the data packet, fetching a next tail descriptor from the descriptor table.

In some aspects, the method includes, in response to determining that a tail descriptor of the one or more tail descriptors is a last tail descriptor of the descriptor table and that the running count of the buffer size of the chain descriptor including the last tail descriptor does not satisfy the size of the data packet, generating an error signal.

In some aspects, the method includes handing off fetch operations of the one or more tail descriptors from a main linked list circuit to a chain handler configured to fetch the one or more tail descriptors. The method includes obtaining a next descriptor for processing a further data packet. The obtaining the next descriptor is performed concurrently with the fetch operations of the one or more tail descriptors by the chain handler.

In some aspects, the direct memory access system includes a plurality of chain handlers each configured to fetch tail descriptors from descriptor tables. In that case, the method includes fetching a plurality of tail descriptors in parallel using the plurality of chain handlers. The method also includes obtaining further descriptors for processing further data packets concurrently with the fetching the plurality of tail descriptors.

In some aspects, the descriptors evaluated for being head descriptors are obtained from an index ring stored in a host memory. The descriptor table storing the tail descriptors is stored in the host memory as a distinct data structure from the index ring.

One or more example implementations are directed to a method of descriptor fetch for a direct memory access system. The method includes reading, by a direct memory access system of a peripheral device, a plurality of pointers from an index ring buffer stored in a host memory. The plurality of pointers specify a plurality of descriptors of a descriptor table stored in the host memory. The method includes determining whether the plurality of descriptors are stored in the descriptor table with incremental index locations. The method includes, in response to determining that the plurality of descriptors are stored in the descriptor table with incremental index locations, generating a single read request specifying the plurality of descriptors. The method includes issuing the single read request to a host system to fetch the plurality of descriptors.

The foregoing and other implementations can each optionally include one or more of the following features, alone or in combination. Some example implementations include all the following features in combination.

In some aspects, the plurality of descriptors having incremental index locations are stored contiguously in the descriptor table.

In some aspects, the reading is performed in response to a received doorbell request specifying the plurality of pointers.

In some aspects, generating the single read request includes coalescing a plurality of individual read requests corresponding to individual ones of the plurality of descriptors into the single read request.

One or more example implementations are directed to a direct memory access system having a multi-queue stream circuit. The multi-queue stream circuit includes a descriptor prefetch circuit configured to receive descriptor request events. The descriptor prefetch circuit includes a main linked list circuit configured to store descriptors in a memory, dequeue descriptors from the memory, and determine whether descriptors, as dequeued, are head descriptors of chain descriptors specifying descriptor tables. The descriptor prefetch circuit includes a chain handler configured to fetch tail descriptors from the descriptor tables of the chain descriptors based on the descriptors, as dequeued by the main linked lists circuit and determined to be head descriptors. The chain handler is configured to operate concurrently with the main linked lists circuit.

The foregoing and other implementations can each optionally include one or more of the following features, alone or in combination. Some example implementations include all the following features in combination.

In some aspects, the chain handler includes a chain logic circuit configured to issue credit to a fetch circuit for fetching the tail descriptors and a chain linked list circuit configured to receive the tail descriptors from the fetch circuit.

In some aspects, a number of the tail descriptors fetched is determined based on a running count of a buffer size of the chain descriptor determined as each tail descriptor is fetched compared to a size of a data packet being processed.

In some aspects, the chain handler includes chain logic circuit configured to determine, for each tail descriptor fetched, whether the running count of the buffer size of the chain descriptor satisfies the size of the data packet. The chain logic circuit is configured to, in response to determining that the running count of the buffer size of the chain descriptor including a most recently fetched tail descriptor does not satisfy the size of the data packet, fetch a next tail descriptor from the descriptor table.

In some aspects, the chain handler includes chain logic circuit configured to determine, for each tail descriptor fetched, whether the running count of the buffer size of the chain descriptor satisfies the size of the data packet. The chain logic circuit is configured to, in response to determining that the running count of the buffer size of the chain descriptor including a most recently fetched tail descriptor does satisfy the size of the data packet, discontinue fetching of tail descriptors from the descriptor table.

In some aspects, the chain handler includes a chain logic circuit configured to, in response to detecting a last tail descriptor of the tail descriptors for a selected descriptor table and determining that the running count of the buffer size of the chain descriptor including the last tail descriptor does not satisfy the size of the data packet, generate an error signal.

In some aspects, the main linked lists circuit is configured to provide each descriptor determined to be a head descriptor to the chain handler for further processing. The main linked lists circuit processes a next descriptor from the memory therein while the chain handler processes the head descriptor received from the main linked list.

In some aspects, the descriptor prefetch circuit includes a plurality of chain handlers each configured to fetch tail descriptors from the descriptor tables of the chain descriptors for the descriptors dequeued by the main linked lists circuit and determined to be head descriptors. The main linked lists circuits is configured to provide descriptors determined to be head descriptors to different ones of the plurality of chain handlers and continue processing further descriptors dequeued from the memory therein concurrently with the plurality of chain handlers processing tail descriptors for the head descriptors received from the main linked lists circuits.

One or more example implementations are directed to a method of descriptor fetch for a direct memory access system. The method includes, in response to receiving a first data packet, fetching a plurality of descriptors including a first descriptor and a specified number of prefetched descriptors. The plurality of descriptors specify different buffer sizes. The method includes, in response to processing each data packet, selectively replenishing the plurality of fetched descriptors to the specified number of prefetched descriptors.

The foregoing and other implementations can each optionally include one or more of the following features, alone or in combination. Some example implementations include all the following features in combination.

In some aspects, the plurality of chain handlers are configured to operate in parallel with one another and with the main linked list such that at least two of the plurality of chain handlers operate in parallel fetching tail descriptors.

In some aspects, the method includes, in response to receiving a first data packet, fetching a plurality of descriptors including a first descriptor and a specified number of prefetched descriptors. The plurality of descriptors specify different buffer sizes. The method includes, in response to processing each data packet, selectively replenishing the plurality of fetched descriptors to the specified number of prefetched descriptors.

In some aspects, the method includes, in response to receiving subsequent data packets, fetching one descriptor per subsequent data packet.

In some aspects, the fetching of one descriptor per subsequent data packet is performed in response to receiving each individual data packet.

In some aspects, the specified number of prefetched descriptors is programmable.

In some aspects, the specified number of prefetched descriptors is maintained during operation of the direct memory access system.

In some aspects, replenishing the plurality of fetched descriptors includes, in response to processing each data packet, determining a number of the prefetched descriptors consumed in processing the data packet and prefetching a number of additional prefetched descriptors corresponding to the number of prefetched descriptors consumed in processing the data packet.

In some aspects, the method includes dynamically switching between a variable size buffer descriptor handling mode and a low latency mode during operation.

In some aspects, the method includes, for each received descriptor, comparing a length of a buffer specified by the descriptor with a threshold length and, in response to determining that the length of the buffer is greater than or equal to the threshold length, adding the descriptor to a queue corresponding to the descriptor and enabling a low latency mode for the queue.

In some aspects, the method includes dequeuing a descriptor from a selected queue, determining a length of a buffer specified by the descriptor, comparing the length of the buffer to the threshold length, determining whether low latency mode is enabled for the selected queue, and, in response to determining that the length of the buffer is greater than or equal to the threshold length and that low latency mode is enabled for the selected queue, processing a data packet using the descriptor in the low latency mode.

In some aspects, the method includes dequeuing a descriptor from a selected queue, determining a length of a buffer specified by the descriptor, comparing the length of the buffer to the threshold length, determining whether low latency mode is enabled for the selected queue, and, in response to determining that the length of the buffer is less than the threshold length or that low latency mode is not enabled for the selected queue, processing a data packet using the variable size buffer descriptor mode.

One or more example implementations are directed to a direct memory access system having a multi-queue stream circuit. The multi-queue stream circuit includes a descriptor prefetch circuit configured to receive descriptor request events. The descriptor prefetch circuit includes a prefetch credit circuit configured to receive the descriptor request events and issue credit to a fetch circuit for a plurality of descriptors including a first descriptor and a specified number of prefetched descriptors. The descriptor prefetch circuit includes a prefetch cache configured to receive the plurality of descriptors. The plurality of descriptors specify different buffer sizes. The prefetch cache, in response to processing each data packet, is configured to selectively replenish the plurality of fetched descriptors to the specified number of prefetched descriptors.

The foregoing and other implementations can each optionally include one or more of the following features, alone or in combination. Some example implementations include all the following features in combination.

In some aspects, in response to receiving subsequent data packets, the prefetch credit circuit is configured to issue credit to the fetch circuit to fetch one descriptor per subsequent data packet.

In some aspects, the fetching one descriptor per subsequent data packet is initiated by the prefetch credit circuit in response to receiving each individual data packet.

In some aspects, the specified number of prefetched descriptors is programmable.

In some aspects, the specified number of prefetched descriptors is maintained during operation of the direct memory access system.

In some aspects, the prefetch cache is configured to, in response to processing each data packet, determine a number of the prefetched descriptors consumed in processing the data packet and prefetch a number of additional prefetched descriptors corresponding to the number of prefetched descriptors consumed in processing the data packet.

In some aspects, the descriptor prefetch circuit is configured to dynamically switch between a variable size buffer descriptor handling mode and a low latency mode during operation.

In some aspects, the prefetch cache includes a main linked lists circuit including a descriptor queueing circuit. The descriptor queueing circuit is configured to compare a length of a buffer specified by each received descriptor with a threshold length and, in response to determining that the length of the buffer is greater than or equal to the threshold length, add the descriptor to a queue corresponding to the descriptor and enable a low latency mode for the queue.

In some aspects, the main linked lists circuit further includes a descriptor dequeuing circuit. The descriptor dequeuing circuit is configured to dequeue a descriptor from a selected queue, determine a length of a buffer specified by the descriptor, compare the length of the buffer to the threshold length, determine whether low latency mode is enabled for the selected queue, and, in response to determining that the length of the buffer is greater than or equal to the threshold length and that low latency mode is enabled for the selected queue, process a data packet using the descriptor in the low latency mode.

In some aspects, the main linked lists circuit further includes a descriptor dequeuing circuit. The descriptor dequeuing circuit is configured to dequeue a descriptor from a selected queue, determine a length of a buffer specified by the descriptor, compare the length of the buffer to the threshold length, determine whether low latency mode is enabled for the selected queue, and, in response to determining that the length of the buffer is less than the threshold length or that low latency mode is not enabled for the selected queue, process a data packet using the variable size buffer descriptor mode.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 7 illustrates an example method of performing indirect descriptor fetch using pointers and descriptor tables.

DETAILED DESCRIPTION

Figure 1:
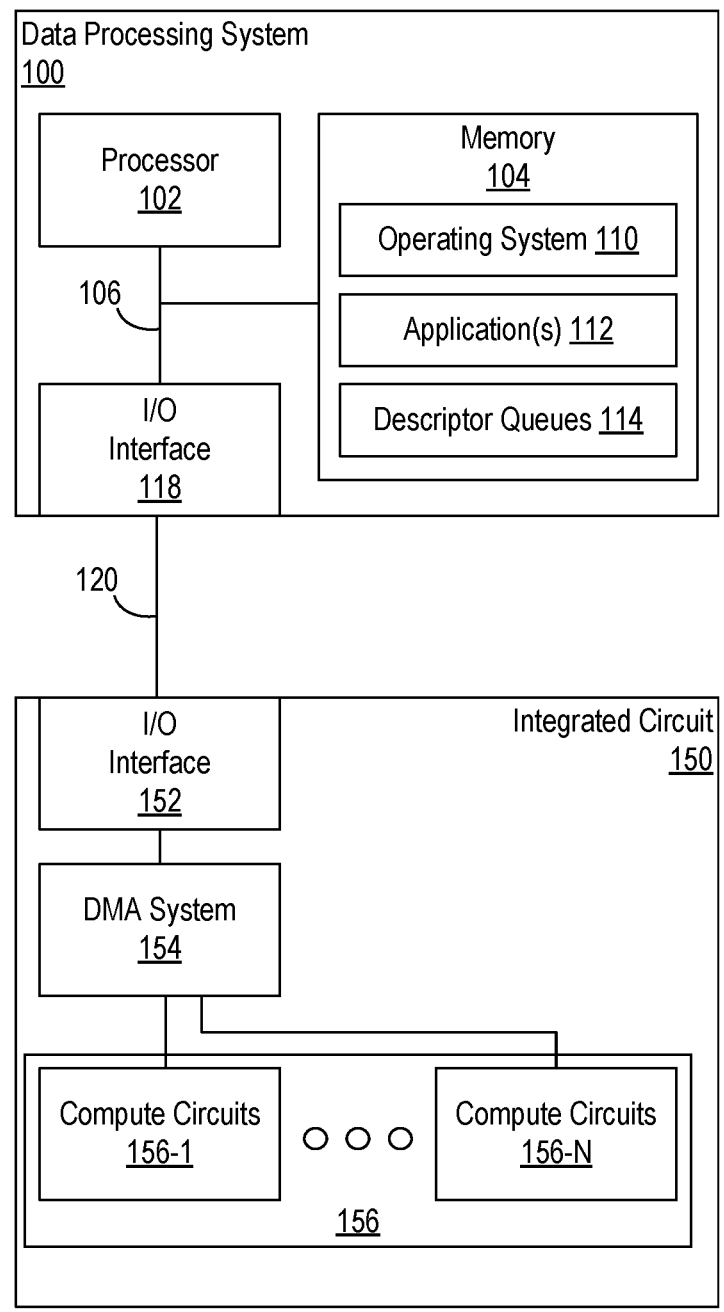
FIG. 1 illustrates an example computing system including a direct memory access (DMA) system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to descriptor fetching for a multi-queue direct memory access (MQ-DMA) system. In accordance with the inventive arrangements described within this disclosure, an MQ-DMA system is disclosed that is capable of implementing descriptor fetch operations to facilitate high performance operation and efficient data movement between one or more host systems and a peripheral device in which the MQ-DMA system is disposed. The inventive arrangements described herein provide one or more descriptor fetch mechanisms that, when implemented, are capable of reducing the latency in obtaining descriptors and increasing the bandwidth achieved by the MQ-DMA system.

In one or more example implementations, the MQ-DMA system is capable of implementing indirect descriptor fetch operations. Indirect descriptor fetch refers to a mode of operation that uses an index ring and a descriptor table. The index ring is configured to store one or more pointers. Each of the pointers is capable of pointing to a particular descriptor stored in the descriptor table. In one or more example implementations, the MQ-DMA system is capable of evaluating the pointers to determine whether the pointers are pointing to a plurality of descriptors in the descriptor table that are stored contiguously, e.g., with incremental indexes. The MQ-DMA system is capable of fetching a plurality of descriptors determined to be contiguous as a single DMA operation thereby reducing the amount of time needed to perform descriptor fetch by coalescing multiple fetch operations into a single fetch operation and reducing communication bus overhead.

In one or more example implementations, the MQ-DMA system is capable of implementing one or more direct descriptor fetch operations. In one aspect, the MQ-DMA system is capable of implementing direct descriptor fetch using chain descriptor handling. A chain descriptor refers to a descriptor data structure that utilizes an index ring and one or more descriptor tables. The index ring stores one or more head descriptors. Each head descriptor points to a descriptor table (e.g., a different descriptor table) that includes one or more tail descriptors. Each chain descriptor is formed of a head descriptor from the index ring and one or more tail descriptors stored in a particular descriptor table associated with the head descriptor. An MQ-DMA system in accordance with the inventive arrangements described herein is capable of processing chain descriptors and servicing applications that utilize such descriptor data structures. In one or more example implementations, the MQ-DMA system is capable of processing a plurality of chain descriptors in parallel (e.g., concurrently). The ability to process a plurality of chain descriptors in parallel can increase the data throughput of the MQ-DMA system.

In one or more example implementations, the MQ-DMA system is capable of implementing additional direct descriptor fetch operations involving descriptors that specify variable buffer sizes. In specifying variable buffer sizes, the number of descriptors that are needed to move a packet of data is not known a priori. In accordance with the inventive arrangements described within this disclosure, a prefetch mechanism is implemented for use with descriptors that specify variable buffer sizes (also referred to herein as variable buffer size descriptors).

Accordingly, in processing a received data packet, the MQ-DMA system is capable of fetching a first descriptor and prefetching one or more additional descriptors. The first descriptor is consumed since each data packet to be sent by the MQ-DMA system is guaranteed to consume at least one descriptor. The MQ-DMA system is capable of determining the number of prefetch descriptors consumed to send the data packet and, in response to consuming the prefetch descriptors, replenishing the prefetch descriptors to the original number fetched. This mechanism seeks to maintain a constant number of prefetched descriptors by replacing those that have been consumed to process received data. The inventive arrangements facilitate efficient operation of the MQ-DMA system by ensuring that sufficient descriptors are available to process data despite not knowing a priori how many descriptors will be required to move any given data packet.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing system in which the inventive arrangements may be implemented. As shown, the example computing system of FIG. 1 includes a data processing system 100 coupled to an IC 150. IC 150 is an example of a peripheral device of data processing system 100. For instance, IC 150 may be a hardware accelerator. Though not illustrated, IC 150 may be disposed on a circuit board. The circuit board may have volatile memory (not shown) and/or non-volatile memory (not shown) disposed thereon and coupled to IC 150.

In one aspect, the circuit board may be implemented with a card type of form factor allowing the circuit board to be inserted into a card slot, e.g., an available bus (e.g., Peripheral Component Interconnect Express (PCIe)) slot, of data processing system 100. It should be appreciated, however, that the circuit board may have any of a variety of different form factors so long as IC 150 is coupled to data processing system 100.

Data processing system 100 can include a processor 102, a memory 104, a bus 106, and an input/output (I/O) interface 118. Bus 106 couples processor 102 with memory 104 and I/O interface 118. Data processing system 100 is an example implementation of a host system. It should be appreciated that data processing system 100 is only one example implementation. Data processing system 100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. Data processing system 100 may include a plurality of host systems that are virtualized (e.g., virtual machines, containers, etc.).

Processor 102 is a hardware processor and may be implemented as one or more hardware processors. In an example, processor 102 is implemented as a CPU. Processor 102 may be implemented as one or more circuits capable of carrying out instructions contained in computer-readable program code or instructions. Processor 102 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 106 represents one or more of any of a variety of communication bus structures. By way of example, and not limitation, bus 106 may be implemented as a PCIe bus.

Data processing system 100 typically includes a variety of computer system readable media illustrated as memory 104. Such media may include computer-readable volatile and non-volatile media and computer-readable removable and non-removable media. For example, memory 104 can include computer-readable media in the form of volatile memory, such as random-access memory (RAM) and/or cache memory. Data processing system 100 also can include other removable/non-removable, volatile/non-volatile computer storage media. By way of example, memory 104 may include a storage system capable of reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each form of media can be connected to bus 106 by one or more data media interfaces. Memory 104 is an example of at least one computer program product.

Memory 104 is capable of storing program instructions that are executable by processor 102. For example, the program instructions can include an operating system 110, one or more application programs 112, other program code, and program data. In the example, memory 104 stores program data such as a plurality of descriptor queues 114. Processor 102, in executing the program instructions, is capable of performing the various operations described herein attributable to a host system.

It should be appreciated that data items used, generated, and/or operated upon by data processing system 100 are functional data structures that impart functionality when employed by data processing system 100. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

I/O interface 118 allows data processing system 100 to communicate with one or more peripheral devices such as IC 150. Examples of I/O interface 118 may include, but are not limited to, network cards, modems, network adapters, hardware controllers, etc. In an example implementation, I/O interface 118 includes a PCIe interface or adapter.

IC 150 may be implemented as any of a variety of different types of ICs. For example, IC 150 may be implemented as a System-on-Chip (SoC), an Application-Specific IC (ASIC), an adaptive IC such as a Field Programmable Gate Array (FPGA), or the like. An adaptive IC is an IC that may be updated subsequent to deployment of the device into the field. An adaptive IC may be optimized, e.g., configured or reconfigured, for performing particular operations after deployment. The optimization may be performed repeatedly over time to meet different requirements or needs.

In the example of FIG. 1, IC 150 includes an I/O interface 152, a DMA system 154, and one or more compute circuits 156 (e.g., 156-1 through 156-N). As illustrated, I/O interface 152 is coupled to DMA system 154. In the example, I/O interface 152 may be implemented as a PCIe interface or adapter. Data processing system 100 and IC 150 communicate over a communication link 120 using their respective I/O interfaces 118, 152. In an example implementation, communication link 120 may be implemented as a PCIe connection.

DMA system 154 is an example of an MQ-DMA system. DMA system 154 is coupled to compute circuits 156. Compute circuits 156 may be implemented as any of a variety of different types of circuits to which computing tasks or jobs may be offloaded. For example, compute circuits 156 may be hardened (e.g., ASICs), user-specified circuits implemented using programmable circuitry (e.g., programmable logic such as FPGA gates and/or logic circuitry), third-party Intellectual Property Cores whether implemented as hardened circuits or in programmable circuitry, a data processing circuit array or portions thereof, graphics processing units (GPUs), other hardware processors (e.g., whether hardened or implemented using programmable circuitry), or any combination thereof. In one or more example implementations, one or more of compute circuits 156 may be implemented as a Network Interface Card (NIC).

In general, DMA system 154 is configured to exchange data between data processing system 100 and IC 150. More particularly, DMA system 154 is configured to exchange data between one or more processes, applications, and/or functions executing in data processing system 100 and the various compute circuits 156 of IC 150 by way of communication link 120. Though one data processing system is illustrated, it should be appreciated that IC 150 may be accessed by and/or coupled to a plurality of different host systems including one or more virtualized systems by way of DMA system 154 communicating over a plurality of communication links.

In the example, DMA system 154 may be implemented entirely as hardened circuitry (e.g., ASIC circuitry), entirely using programmable circuitry (e.g., programmable logic such as FPGA programmable logic), or a combination of one or more hardened components/elements and one or more components/elements implemented in programmable circuitry.

Figure 2:
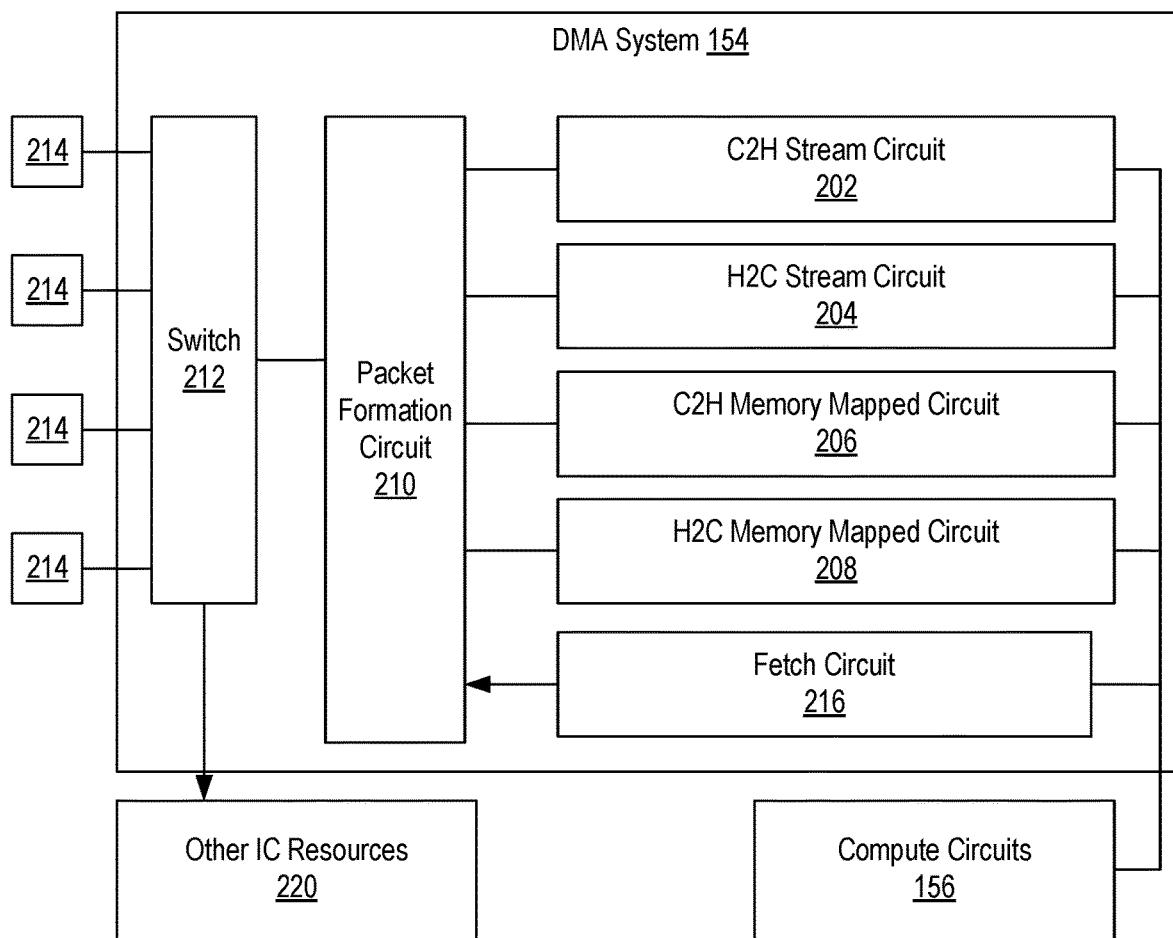
FIG. 2 illustrates an example implementation of the DMA system of FIG. 1.

FIG. 2 illustrates certain aspects of IC 150 and DMA system 154 in greater detail. In the example of FIG. 2, a more detailed example of DMA system 154 is illustrated. It should be appreciated that the particular architecture shown in FIG. 2 is provided for purposes of illustration and not limitation. For example, DMA system 154 may include fewer or more of the circuits illustrated and/or circuits of different varieties than shown.

In the example, DMA system 154 is an MQ-DMA system. For purposes of illustration, DMA system 154 includes a C2H stream circuit 202, an H2C stream circuit 204, a C2H memory mapped circuit 206, an H2C memory mapped circuit 208, and a fetch circuit 216. The term "C2H" means "card-to-host" referring to the case where IC 150 sends data to one or more host systems such as data processing system 100. The term "H2C" means "host-to-card" referring to the case where the host system sends data to IC 150. It should be appreciated that C2H and H2C represent the direction of data flow. As such, regardless of whether the data flow is in the C2H or H2C direction, signals may be sent bidirectionally to send data and/or receive any replies and/or acknowledgements. In the example, one or more of the circuits illustrated such as C2H stream circuit 202 may be implemented as multi-queued designs.

In the example, each of C2H stream circuit 202, H2C stream circuit 204, C2H memory mapped circuit 206, H2C memory mapped circuit 208, and fetch circuit 216 is coupled to packet formation circuit 210. Packet formation circuit 210 is capable of generating Transaction Layer Packets (TLPs) from data received from C2H stream circuit 202, H2C stream circuit 204, C2H memory mapped circuit 206, H2C memory mapped circuit 208, and/or fetch circuit 216. Packet formation circuit 210 is capable of translating TLPs from one or more host systems into a data format usable by C2H stream circuit 202, H2C stream circuit 204, C2H memory mapped circuit 206, H2C memory mapped circuit 208, and/or fetch circuit 216.

Packet formation circuit 210 is coupled to switch 212. Switch 212 is coupled to one or more other resources of IC 150 illustrated as "other IC resources" 220. In the example, DMA system 154 may be included in a larger system such as a System-on-Chip (SoC) implementation of IC 150 having a variety of different circuits and/or systems. In this regard, the other IC resources 220 may represent any of a variety of circuits and/or systems such as, for example, ASIC (e.g., hardened) circuit blocks, user circuitry implemented in programmable logic and/or circuitry, one or more processors capable of executing program code (e.g., a processor system), a programmable network-on-chip, a data processing array, and/or various combinations thereof.

Switch 212 is also coupled to one or more controllers 214. In some aspects, one or more or all (e.g., each) of controllers 214 may be implemented as a bus controller. An example of a bus controller is a PCIe controller. Each of controllers 214 may be configured to communicate over a respective port and communication link with a particular host system (not shown).

In the example of FIG. 2, packets from a network (not shown) may be sent to H2C stream circuit 204 and/or the various circuits represented by other IC resources 220. Similarly, H2C stream circuit 204 and/or other IC resources 220 may send packets to the network. This allows both the host system and the SoC to utilize the same driver for communication.

Figure 3:
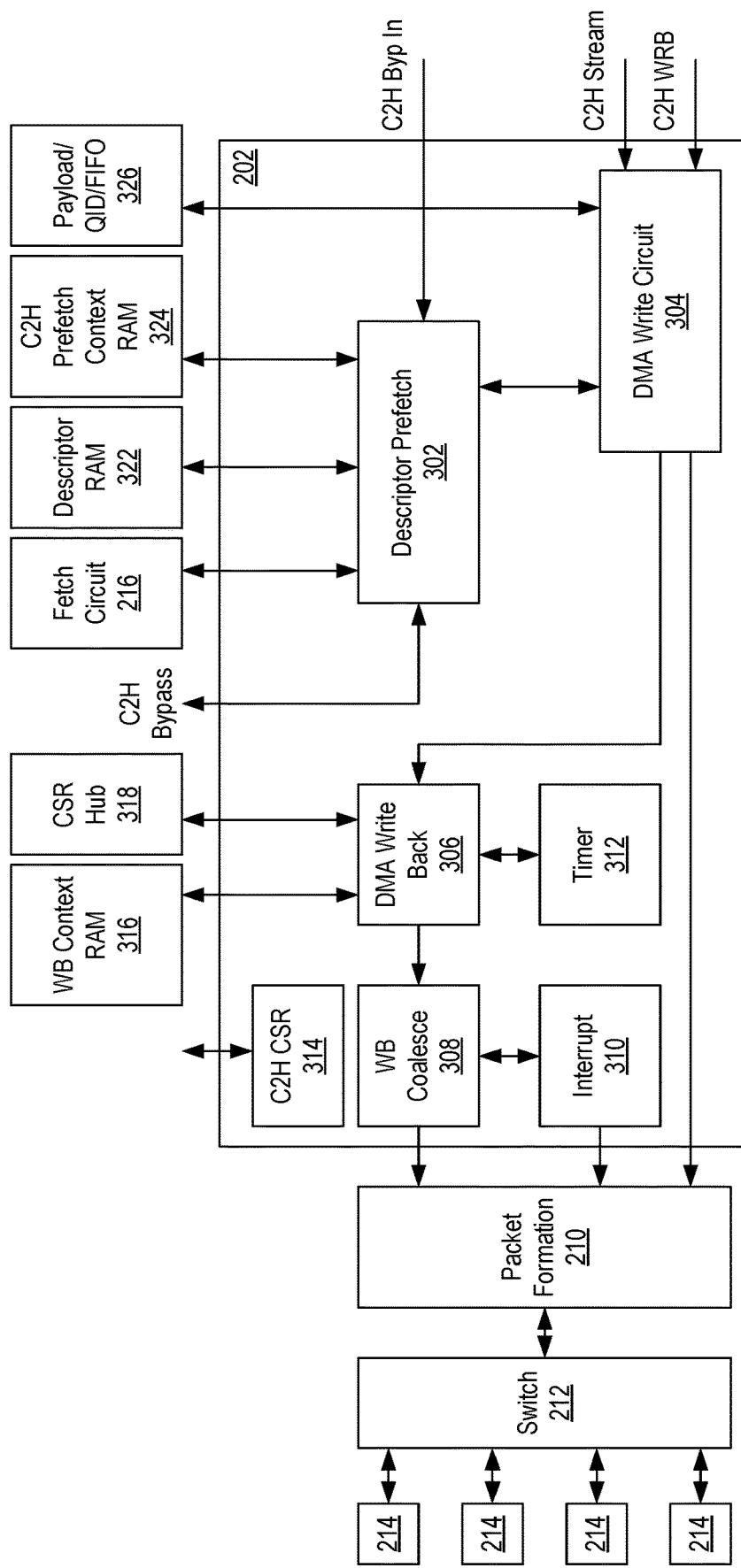
FIG. 3 illustrates an example implementation of a Card-to-Host stream circuit of the DMA system of FIG. 1.

FIG. 3 illustrates an example implementation of C2H stream circuit (hereafter "stream circuit") 202 coupled to controllers 214 by way of packet formation circuit 210 and switch 212. In the example, stream circuit 202 includes a descriptor prefetch 302, a DMA write circuit 304 (e.g., a C2H write circuit), a DMA write back 306, a write back (WB) coalesce 308, an interrupt 310, a timer 312, and a C2H control status register (CSR) 314. FIG. 3 also illustrates WB context RAM 316, CSR hub 318, descriptor RAM 322, C2H prefetch context RAM 324, and payload/QID/FIFO 326, which are implemented in IC 150.

In the example of FIG. 3, DMA write back 306 is capable of accessing WB context RAM 316 and CSR hub 318. WB context RAM 316 operates as a completion context RAM that is capable of storing the information needed to send completions such as, for example, the address of the host memory that stores the completions. CSR hub 318 may serve as an interface for accessing C2H CSR 314. C2H CSR 314 are control registers for stream circuit 202. Payload/QID/FIFO 326 is operable to store the payload and queue information of data packets received by stream circuit 202 from the user (e.g., from compute circuits 156).

Descriptor prefetch 302 includes a C2H bypass communication port and a C2H bypass input port (e.g., shown as C2H Byp In) that allows other circuits in IC 150, e.g., compute circuits 156, to access descriptor prefetch 302 without first accessing DMA write circuit 304. As shown, descriptor prefetch 302 is coupled to fetch circuit 216, descriptor RAM 322, and C2H prefetch context RAM 324. C2H prefetch context RAM 324 is operable to store prefetch information of a queue. For example, C2H prefetch context RAM 324 is capable of storing information such as the number of descriptors that get prefetched. DMA write circuit 304 is coupled to payload/QIF/FIFO 326, DMA write back 306, and packet formation circuit 210. DMA write circuit 304 has a C2H stream input port configured to receive data conveyed from compute circuits 156 to be sent to a destination by DMA system 154 and a C2H write back port (e.g., shown as C2H WRB).

DMA write back 306 is configured to handle write back operations that indicate that data has been provided to a host system. WB coalesce 308 is capable of operating on write backs. For example, WB coalesce 308 may coalesce or combine two or more write back operations into a single write back operation. DMA write back 306 is capable of writing write back information to WB context RAM 306. Timer 312 may be used by DMA write back 306 to control how often to perform write back operations. For example, after DMA write circuit 304 writes a payload of data to packet formation circuit 210 and DMA write back 306 performs a write back, an interrupt may be generated by interrupt 310 to the host system.

Figure 4:
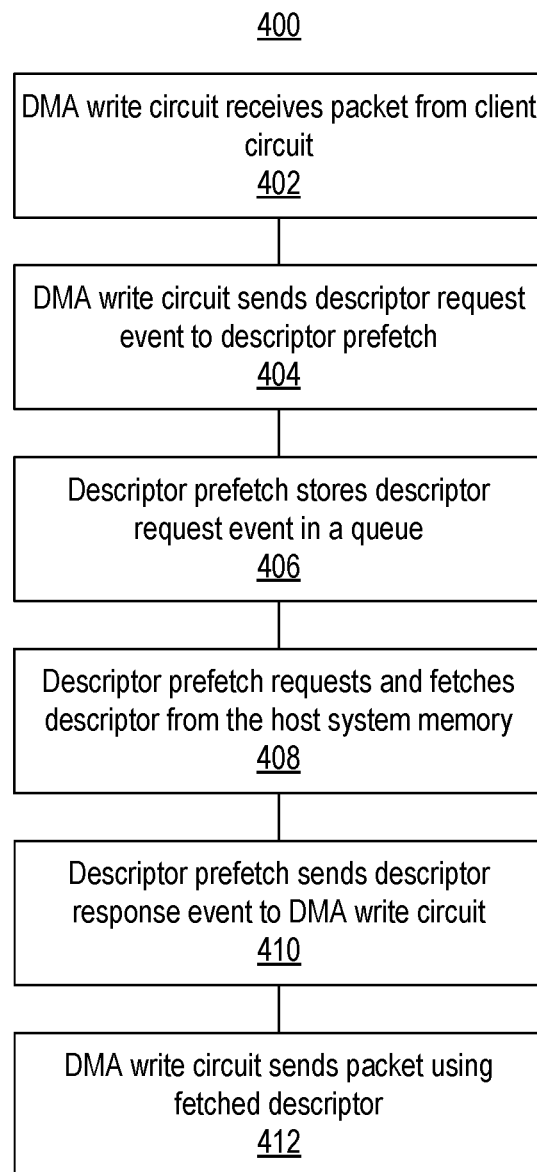
FIG. 4 illustrates an example method illustrating certain operative features of the DMA system of FIG. 1 including the Card-to-Host stream circuit.

FIG. 4 illustrates an example method 400 of certain operative features of DMA system 154 and of stream circuit 202. In block 402, DMA write circuit 304 receives a packet from a client circuit such as one of the compute circuits 156 of IC 150. The received packet may include queue identifying information such as a queue identifier that specifies the particular queue of the host system to which the packet belongs or corresponds. In one or more examples, the packet may specify other information such as a tag that may be mapped or used to derive the queue identifier and/or queue.

In an example implementation, DMA write circuit 304 receives the packet over a streaming interface. The streaming interface may be implemented as an "AXI" streaming interface in reference to a streaming interface implemented in accordance with the Advanced Microcontroller Bus Architecture (AMBA) extensible Interface (AXI) protocol. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

In block 404, DMA write circuit 304 sends a descriptor request event to descriptor prefetch 302. In block 406, in response to receiving the descriptor request event, descriptor prefetch 302 stores the descriptor request event in a descriptor list (e.g., a list with first-in-first-out ordering) within an internal memory described in greater detail in connection with FIG. 5. The internal memory (e.g., cache memory 512 of FIG. 5) includes a plurality of entries. Each entry may store a descriptor list. Each descriptor list is capable of storing one or more descriptor request events having a same identifier. For example, a descriptor list may be created in an available entry of the internal memory in response to determining that a descriptor list having a same identifier as the received data does not exist therein. The descriptor request event is added to the newly created descriptor list. Otherwise, the descriptor request event is added to an existing descriptor list of the internal memory that has a same identifier as the received data. Being organized according to identifiers, each descriptor list stored in an entry will correspond to a particular or same queue of the host system.

In block 408, descriptor prefetch 302 sends a request for a descriptor to fetch circuit 216. Fetch circuit 216 fetches one or more descriptors from host memory. The descriptor(s), as fetched by fetch circuit 216 from appropriate descriptor queues 114 of the host memory, are provided to descriptor prefetch 302, which may store the descriptor(s) in descriptor RAM 322. In this regard, descriptor prefetch 302 may be said to have fetched the descriptor(s). In block 410, descriptor prefetch 302 sends a descriptor response event to DMA write circuit 304 by way of a descriptor response interface coupled to descriptor prefetch 302. The descriptor response event indicates that one or more descriptors have been obtained in response to the previously received descriptor request event. At this point, DMA write circuit 304 has received data to be sent via a DMA operation and has a descriptor for use in sending the data. The descriptor specifies information such as the destination address to which the data is to be provided and the address of the memory where the data to be transferred is currently stored.

In block 412, DMA write circuit 304 sends data to packet formation circuit 210 using the descriptor obtained by descriptor prefetch 302. Packet formation circuit 210 may form a TLP from the received data and forward the TLP to switch 212. Switch 212 routes the TLP to a selected controller 214 to continue to memory of a designated host system (e.g., memory 104).

Figure 5:
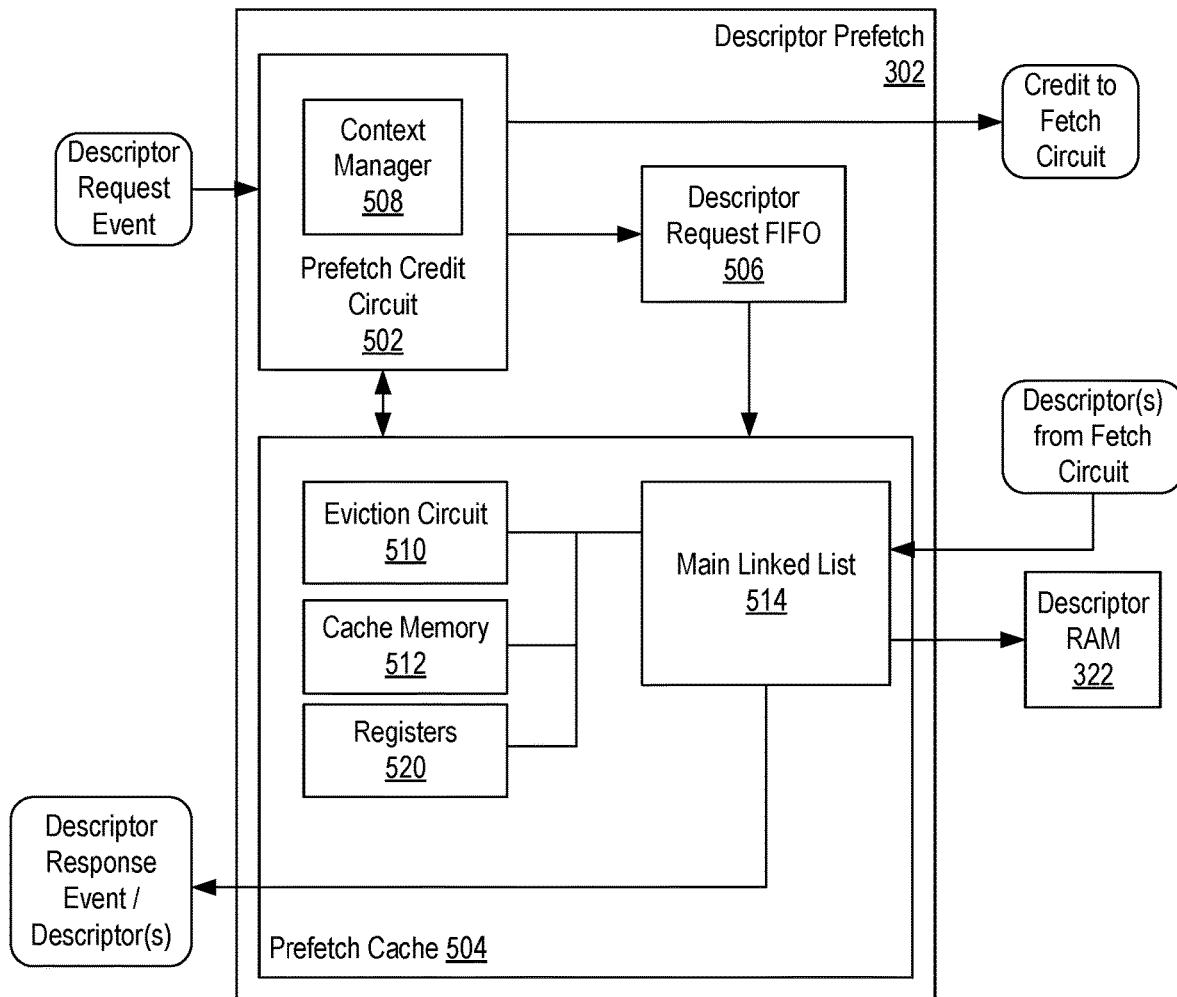
FIG. 5 illustrates an example implementation of a descriptor prefetch circuit of the Card-to-Host stream circuit of FIG. 3.

FIG. 5 illustrates an example implementation of descriptor prefetch 302. In the example, descriptor prefetch 302 includes a prefetch credit circuit 502 coupled to a prefetch cache 504. Prefetch credit circuit 502 may be coupled directly to prefetch cache 504 and also coupled to prefetch cache 504 by way of a descriptor request First-In-First-Out (FIFO) 506. Prefetch credit circuit 502 includes a context manager 508. Prefetch cache 504 includes an eviction circuit 510 coupled to a cache memory 512, registers 520, and main linked lists 514.

Registers 520 may include one or more configuration registers capable of storing configuration data and one or more status registers capable of storing data such as counter information, threshold values, and other information that may be used by prefetch cache 504 during operation. In one aspect, registers 520 may be a subset of, or included within, C2H CSR 314. Main linked lists 514 are capable of processing descriptor information. Main linked lists 514 can include control logic (not shown) and memory that is capable of storing one or more linked lists therein and performing the operations described. In the example, main linked lists 518 represent the circuitry configured to store and/or access linked lists.

In the example of FIG. 5, prefetch credit circuit 502 receives a descriptor request event from DMA write circuit 304. DMA write circuit 304, for example, may receive data and, in response, submit a descriptor request event to prefetch credit circuit 502. Prefetch credit circuit 502 is capable of issuing credit to fetch circuit 216 and placing the descriptor request event as received from DMA write circuit 304 into descriptor request FIFO 506. Issuing credit to fetch circuit 216 initiates a descriptor fetch operation.

In response to the descriptor request event received via descriptor request FIFO 506, eviction circuit 510 adds the descriptor request event to a descriptor list having the same identifier. That is, if no descriptor list exists in cache memory 512 with the same identifier as the descriptor request event (e.g., carried over and/or determined from the received data), eviction circuit 510 creates a descriptor list with the same identifier in a free or available entry of cache memory 512 and adds the descriptor request event to the newly created descriptor list. If a descriptor list having the same identifier as the descriptor request event does exist in cache memory 512, eviction circuit 510 adds the descriptor request event to that descriptor list. In any case, the descriptor request event is added to a descriptor list having the same identifier as specified by the data received by DMA write circuit 304.

The identifier, as discussed, specifies or corresponds to a particular queue in host system memory. Thus, a given entry or descriptor list stored in an entry may be said to correspond to the particular queue of the host memory indicated by the identifier. In an example implementation, cache memory 512 may be implemented as a Content Addressable Memory (CAM). Cache memory 512 is capable of storing those descriptor lists that are active within DMA system 154. Each descriptor list may be stored in an entry available within cache memory 512.

The number of active queues that may be stored in cache memory 512, e.g., the number of queues represented by identifiers of descriptor lists of cache memory 512, may be a fraction of the number of queues that DMA system 154 is capable of handling. For purposes of illustration and not limitation, DMA system 154 may be capable of handling approximately 4,098 C2H queues. Cache memory 512 may include 128 entries thereby enabling cache memory 512 to store free descriptors for 128 different queues. The numbers provided herein as to the number of queues that may be handled and/or may be active are for purposes of illustration only and may be smaller or larger depending on the particular implementation of DMA system 154. In general, however, cache memory 512 stores fewer queues than DMA system 154 is capable of handling.

In the example, prefetch cache 504 receives descriptor(s) from fetch circuit 216. The received descriptor may be logged (e.g., added) to a particular linked list of main linked lists 518 and stored in descriptor RAM 322. In general, main linked lists 518 store a (e.g., one) linked list for each different entry (e.g., and as such for each descriptor list) of cache memory 512. Prefetch cache 504 provides a descriptor response event to DMA write circuit 304 in response to obtaining the descriptor(s) from fetch circuit 216. For example, descriptors may be stored or logged in main linked lists 518 in a particular linked list corresponding to the particular descriptor list (e.g., and as such queue) to which the descriptor belongs. In one aspect, the descriptors may be logged into a particular linked list based on a pre-allocated tag for the queue (e.g., wherein the pre-allocated tag may be specified in the received packet and used to determine or derive the queue identifier). Each descriptor list may, for example, point to a particular and corresponding linked list in main linked lists 518.

In the example, main linked lists 518 store the free descriptors needed to DMA the received packet to host memory. The descriptors in main linked lists 518 can include prefetched descriptors and descriptors needed for the packets in DMA write circuit 304. Cached queues, e.g., in reference to the descriptor lists stored in cache memory 512 that correspond to queues, may have varying numbers of descriptors. If, for example, only one queue is active, then the entire main linked lists 518 has descriptors for one queue. If, for example, more than one queue is active, then main linked lists 518 has descriptors for more than one queue.

Each descriptor list (e.g., corresponding to a queue in host memory) remains in cache memory 512 occupying one of the 128 entries therein until such time that eviction circuit 510 deletes (e.g., evicts) the descriptor list from cache memory 512. A descriptor list may be evicted by marking the entry occupied by the descriptor list as free or available. The descriptors fetched and stored in descriptor RAM 322 are stored in descriptor RAM 322 until consumed or the descriptor list corresponding to the descriptors is evicted. Evicting a descriptor list has the effect of deleting or freeing the memory used to store the descriptors for the evicted descriptor list. Within this disclosure, it should be appreciated that reference to a descriptor list may also refer to the particular queue in host memory from which descriptors are obtained. Accordingly, references to evicting a descriptor list, which corresponds to a particular queue in host memory, may be referred to as "evicting the queue."

In one or more example implementations, descriptor prefetch 302 is capable of implementing indirect descriptor fetch operations using pointers. In general, the pointers are stored in a ring index. The particular descriptors to which the pointers point are stored in a descriptor table. For example, each pointer may store an index location of a particular descriptor stored in the descriptor table. The index ring, for example, stores an index location in the descriptor table for each valid descriptor stored in the descriptor table. Both the descriptor ring and the descriptor table are stored in host memory (memory 104 e.g., as or within descriptor queues 114). In certain cases, a plurality of descriptor fetch operations may be coalesced into a single descriptor fetch operation.

Figure 6A:
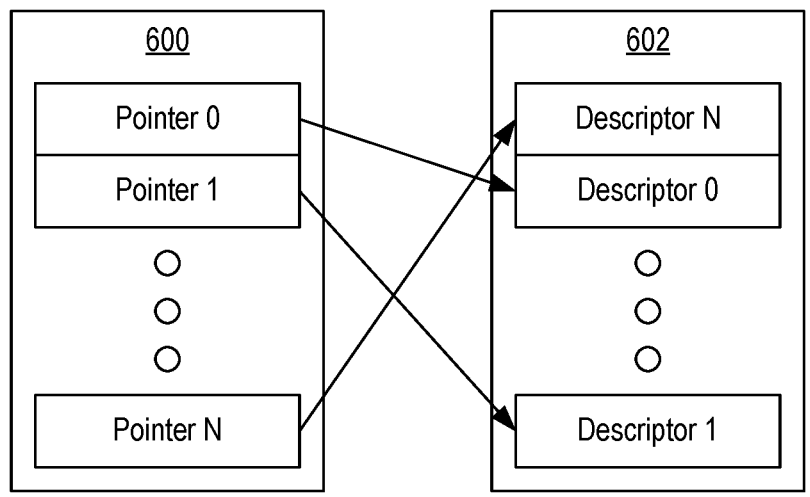
FIGS. 6A, 6B, and 6C illustrate examples of different pointer scenarios.
Figure 6B:
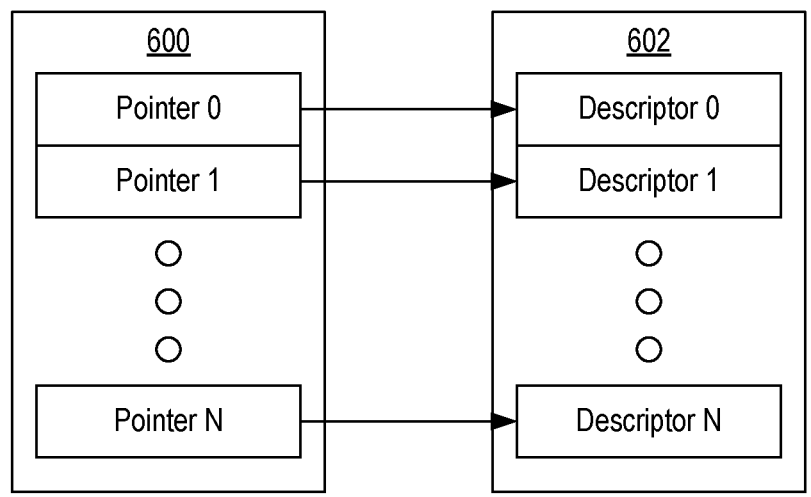
Figure 6C:
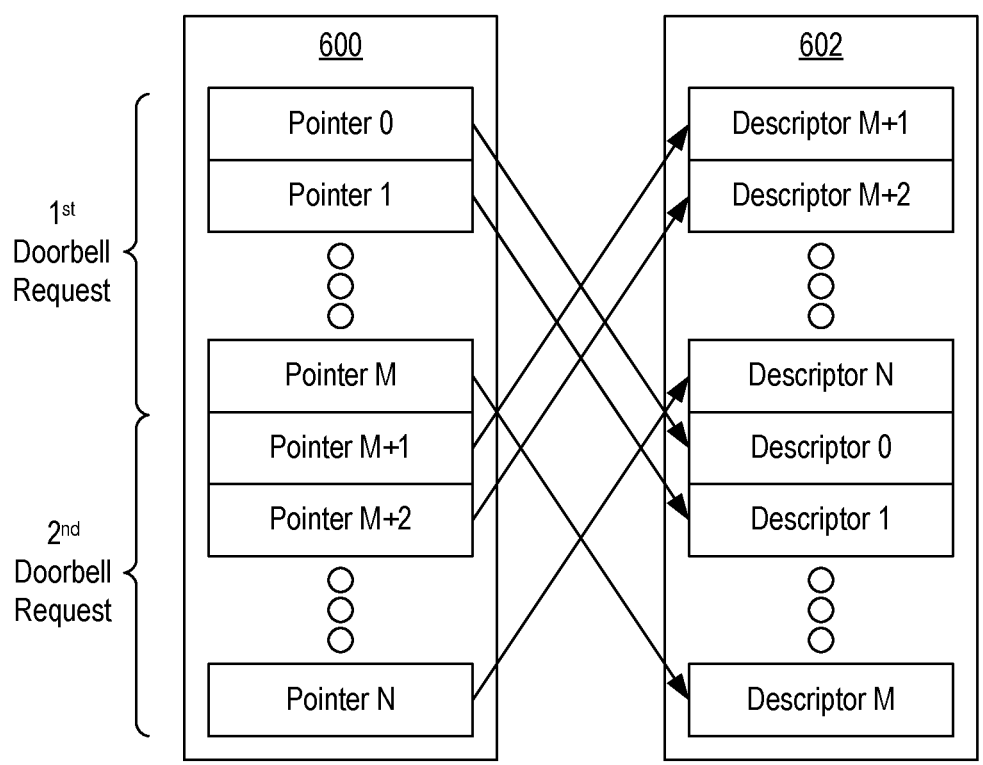

FIGS. 6A, 6B, and 6C illustrate examples of different pointer scenarios. As noted, with reference to FIGS. 6A, 6B, and 6C, the index ring and the descriptor table are stored in memory 104 (e.g., host memory) in separate buffers. In the example of FIG. 6A, index ring 600 includes a plurality of pointers while descriptor table 602 includes a plurality of descriptors. Index ring 600 includes pointers such as pointer 0, pointer 1, through pointer N. Descriptor table 602 includes descriptors such as descriptor 0, descriptor 1, through descriptor N. In the example of FIG. 6A, the descriptors stored in descriptor table 602 are stored in random index locations. That is, descriptors are not stored in descriptor table 602 in order with incremental index locations (e.g., the descriptors are not contiguously, or sequentially, stored in memory). Descriptor 1 is not stored in the next incremental index location of descriptor table 602 progressing from descriptor 0. In this example, descriptor fetch operations may not be coalesced into a single fetch operation.

FIG. 6B illustrates an example where the descriptors of descriptor table 602 are stored in incremental index locations. That is, the descriptors of descriptor table 602 are stored in contiguous entries of descriptor table 602. In the example of FIG. 6B, prefetch cache 504 is capable of coalescing a plurality of fetch operations corresponding to descriptors stored in incremental index locations of descriptor table 602 into a single fetch operation.

FIG. 6C illustrates another example where the descriptors of descriptor table 602 are stored in incremental index locations (e.g., the descriptors of descriptor table 602 are stored in contiguous entries of descriptor table 602). For example, with reference to FIG. 6C, in response to a first doorbell request, prefetch cache 504 is capable of determining that pointers 0–M point to descriptors 0–M, which are stored in incremental index locations of descriptor table 602. Accordingly, the descriptor fetch operations for descriptors 0–M may be coalesced from M+1 descriptor fetch operations into a single descriptor fetch operation that fetches descriptors 0–M. In response to a second doorbell request, prefetch cache 504 is capable of determining that pointers (M+1)–N point to descriptors (M+1)–N and that descriptors (M+1)–N are stored in incremental index locations of descriptor table 602. Accordingly, the descriptor fetch operations for descriptors (M+1)–N may be coalesced from N descriptor fetch operations into a single descriptor fetch operation that fetches descriptors (M+1)–N.

FIG. 7 illustrates an example method 700 of performing indirect descriptor fetch using pointers and descriptor tables. In block 702, DMA system 154 reads a plurality of pointers from index ring 600 as stored in a host memory. The plurality of pointers specify a plurality of descriptors (e.g., index locations thereof) within descriptor table 602, which is also stored in the host memory. For example, in the case of indirect descriptor communication, DMA system 154 reads descriptors from index ring 600 based on a received message, e.g., a doorbell message as received by DMA system 154. In one aspect, the message may be a doorbell producer index update.

As an illustrative example, in response to the received message, prefetch credit circuit 502 issues credit to fetch circuit 216, which fetches the plurality of pointers. The plurality of pointers are received by main linked lists 514 for processing.

In block 704, the DMA system 154 determines whether the plurality of descriptors are stored in descriptor table 602 with incremental index locations. For example, in response to retrieving indexes 0-N, main linked lists 514 determines whether the indexes received point to incremental locations (e.g., indexes) in descriptor table 602. As noted, descriptors stored in incremental locations or indexes of descriptor table 602 are stored contiguously in descriptor table 602 (e.g., in host memory).

In block 706, in response to determining that the plurality of descriptors indicated by the retrieved or read pointers from block 702 are stored in descriptor table 602 with incremental index locations, a single read request specifying the plurality of descriptors is generated. In block 708, DMA system 154 issues the single read request to the host system to fetch the plurality of descriptors. In one or more example implementations, the number of pointers retrieved, and as such the possible number of descriptors retrieved, may be a user-specified setting included in registers 520.

For example, main linked lists 514 may instruct prefetch credit circuit 502 to issue credit to fetch circuit 216 in an amount sufficient to retrieve the plurality of descriptors stored in incremental locations of descriptor table 602. Fetch circuit 216 may fetch the plurality of descriptors, which may be returned to main linked lists 514 for processing and/or use.

In one aspect, the reading of the plurality of pointers is performed in response to a received doorbell request specifying the plurality of pointers. In another aspect, the single read request may be generated by coalescing a plurality of individual read requests corresponding to individual ones of the plurality of descriptors into the single read request.

In cases such as that illustrated in FIG. 6A where descriptors are stored at random indexes, each descriptor would need to be fetched using a separate read request. This increases the overall latency of DMA system 154. The coalescing performed for cases such as FIGS. 6B and/or 6C of read requests for descriptors stored at contiguous locations reduces the overhead involved in fetching descriptors from host memory and reduces the bandwidth consumed over communication link 120. Method 700 may be performed in a dynamic manner while performing indirect descriptor fetch as DMA system 154 operates so that those descriptors that are stored in a descriptor table contiguously may be fetched using a single DMA request, while those descriptors not stored contiguously may be fetched one-by-one.

In one or more example implementations, DMA system 154 may be adapted to support descriptors that specify variable buffer sizes (e.g., variable buffer size descriptors). In the case where DMA system 154 utilizes descriptors that specify a fixed or standard-length buffer size, the number of descriptors needed to send (e.g., satisfy) a data packet may be determined in advance as the buffer size of each descriptor is known. Having this advanced knowledge allows the DMA system 154 to dequeue descriptors from main linked lists 514 efficiently and move on to processing a next packet. In one or more example implementations, one descriptor may be obtained (e.g., dequeued) and consumed every two clock cycles and in some implementations each clock cycle.

In the case of variable buffer size descriptors, the number of descriptors needed to satisfy a data packet cannot be calculated in advance. Instead, the DMA system 154 must iteratively read the variable buffer size descriptor from descriptor RAM 322 and, as each variable buffer size descriptor is read, subtract the length of the buffer specified by the variable buffer size descriptor from the length of the data packet to be sent (e.g., subtract the length of the buffer from the total packet size). This additional processing requires extra time. For example, the amount of time needed to process a variable buffer size descriptor may be approximately 3 clock cycles.

Listing 1 below shows example pseudo code illustrating the operational behavior of main linked lists 514 while operating in the variable buffer size mode.

Listing 1

```
remain_len = packet_len;
while (remain_len > 0) {
    ram_read = 1;
    // Wait 3 cycles
    remain_len = remain_len - read_data.len;
}
```

Referring to Listing 1, main linked lists 514 is configured to decrement a count that is initially set equal to the size of the data packet that is to be sent. Additional descriptors are fetched until such time that the total size of the buffers of the variable buffer size descriptors fetched for the data packet is sufficient to accommodate or satisfy the data packet. Satisfying the data packet refers to the condition where the cumulative size of the buffers fetched for the data packet is the same as or larger than the data packet. In the example, the latency is illustrated as 3 clock cycles. It should be appreciated that the particular number of clock cycles needed may vary based on the particular implementation used. Still, the additional overhead of tracking the amount of buffer space obtained from the fetched variable buffer size descriptors relative to the size of the data packet to be sent will incur additional computational overhead such that handling variable buffer size descriptors will incur more latency than handling descriptors that specify a known and fixed buffer size.

Figure 8:
FIG. 8 illustrates an example method of direct descriptor handling involving descriptors that specify variable buffer sizes.

FIG. 8 illustrates an example method 800 of direct descriptor handling involving descriptors that specify variable buffer sizes (e.g., variable buffer size descriptors). As noted, in the case of variable buffer size descriptors, the buffers specified by different descriptors may vary in size and descriptor prefetch 302 is unable to determine, a priori, how many descriptors are required to process a given data packet. FIG. 8 illustrates an example implementation of a variable buffer size descriptor mode implemented by stream circuit 202. In the examples, the variable buffer size descriptor mode utilizes, or leverages, a descriptor prefetch mode.

For purposes of illustration, consider the following example of descriptor prefetch mode. For a given queue, as a first packet of data for the queue is received, only one descriptor may be needed to move the packet of data. With the prefetch mode turned on for the queue (e.g., the descriptor list in cache memory 512), a descriptor is fetched for the data in addition to one or more additional descriptors called prefetched descriptors. The number of descriptors prefetched may be a user programmable number of descriptors (e.g., as specified in registers 520). The additional or prefetched descriptors may or may not be needed to process the data packet that was received. The prefetched descriptors are available for processing the data packet and/or further data received for the queue in the future.

The descriptor list corresponding to the queue is maintained in cache memory 512 and the prefetched descriptors are stored in descriptor RAM 322. The entry in cache memory 512 may point to a particular linked list in main linked lists 514 for the queue, with the linked list pointing to the prefetched descriptors stored in descriptor RAM 322. If further data is received for the queue, the additional data may be processed using the prefetched descriptors thereby reducing latency in processing the data since descriptors need not be fetched from the queue stored in the host memory to process the newly received data thereby avoiding the significant time needed to fetch descriptors from the host system.

Accordingly, in block 802, in response to receiving a first data packet, descriptor prefetch 302 fetches a plurality of descriptors. In doing so, the descriptors fetched include a first descriptor and a specified number of prefetched descriptors. The plurality of descriptors specify different buffer sizes. As noted, in the example implementations described herein, the processing for variable buffer size descriptors utilizes the descriptor prefetch mode. That is, for a given queue for which the variable buffer size mode is active, the descriptor prefetch mode is also active. In block 804, in response to processing each data packet, descriptor prefetch 302 selectively replenishes the plurality of fetched descriptors to the specified number of prefetched descriptors (e.g., as stored in descriptor RAM 322).

Figure 9:
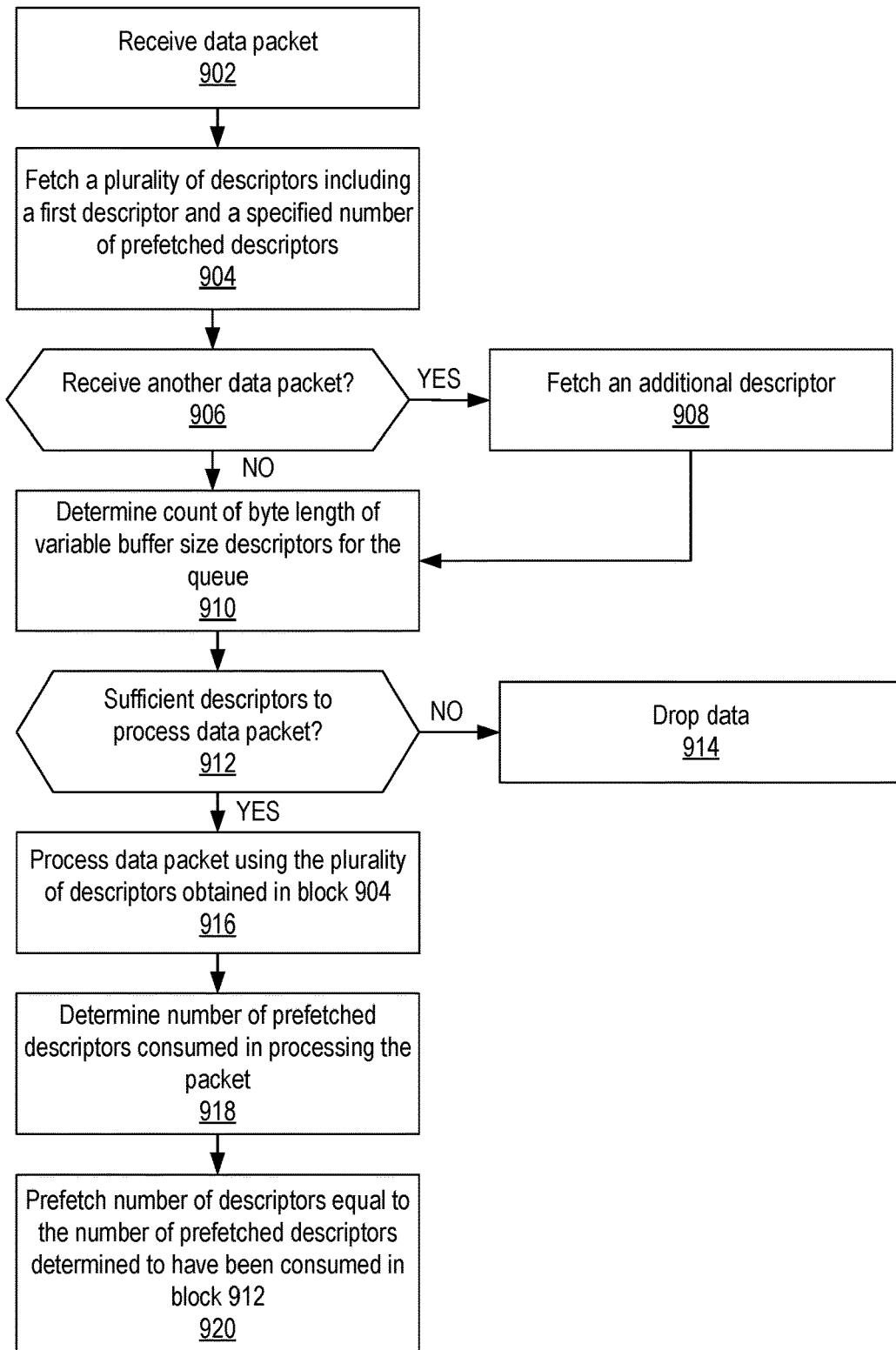
FIG. 9 illustrates another example method of direct descriptor handling involving variable buffer size descriptors.

FIG. 9 illustrates another example method 900 of direct descriptor handling involving variable buffer size descriptors. Method 900 illustrates another more detailed example of a variable buffer size descriptor mode implemented by stream circuit 202. In the example of FIG. 9, for queues that store variable buffer size descriptors, descriptor prefetch 302 may operate in the variable buffer size mode in which prefetch is turned on.

In block 902, DMA write circuit 304 receives a data packet. As discussed, DMA write circuit 304 may notify descriptor prefetch 302 of the received data packet. The received data packet may include information specifying a particular queue to which the data packet belongs. Data regarding the received packet including the queue information for the received packet and size of the packet may be provided from DMA write circuit 304 to descriptor prefetch 302 in a descriptor request event. In this example, the queue(s) are ones for which descriptor prefetch 302 is to operate in the variable buffer size mode.

In block 904, in response to the received data (e.g., the descriptor request event), DMA write circuit 304 fetches a plurality of descriptors. The plurality of descriptors includes a first descriptor and a specified number of prefetched descriptors. For example, prefetch credit circuit 502 is capable of issuing an amount of credit sufficient to cause fetch circuit 216 to fetch a first descriptor and a specified number (e.g., a user-specified number) of prefetched descriptors. The particular number of prefetched descriptors fetched may be specified in a configuration register of registers 520. Main linked lists 514 receives the plurality of fetched descriptors. The fetched descriptors (e.g., the first descriptor and the prefetched descriptors) may be in a linked list within main linked lists 514 corresponding to the queue and stored in descriptor RAM 322. In one aspect, the specified number of descriptors exceeds a maximum descriptor count per-packet. The fetched descriptors are variable buffer size descriptors.

In block 906, DMA write circuit 304 determines whether another data packet is received. In response to receiving another data packet, method 900 continues to block 908. If no additional data packet is received, method 900 continues to block 910. In block 908, descriptor prefetch 302 fetches an additional descriptor. For example, DMA write circuit 304 notifies descriptor prefetch 302 of the received data by way of a descriptor request event and, in response, descriptor prefetch 302 fetches another descriptor. Prefetch credit circuit 502 issues credit to fetch circuit 216, which obtains a descriptor (e.g., a variable buffer size descriptor) that is provided to main linked lists 514. In one or more example implementations, for each additional data packet that is received, an additional descriptor (e.g., one descriptor) is fetched automatically by descriptor prefetch 302. Descriptor prefetch 302 fetches a descriptor, which is not considered a prefetched descriptor and does not count toward the prefetch descriptor limit, for each additional data packet received because at least one descriptor is guaranteed to be consumed for each data packet received despite the variable buffer size of the descriptors.

In the example of FIG. 9, blocks 906 and 908 are illustrated in the context of a single process. It should be appreciated that blocks 906 and 908 may represent a parallel process that is initiated and continues to run independently of the other blocks. That is, while one or more other blocks of method 900 are being performed, blocks 906 and/or 908 may be performed in parallel (e.g., continuously) to monitor and accommodate newly received data packets. For example, in response to receiving subsequent data packets, one descriptor is fetched per subsequent data packet. The fetching of the single data packet may be performed in response to receiving each individual data packet.

In block 910, main linked lists 514 is capable of determining a count of byte length for the variable buffer size descriptors that have been fetched and added to the descriptor lists. In one aspect, in response to each variable buffer size descriptor being retrieved and added to a descriptor list corresponding to a particular queue, main linked lists 514 accumulates the length of the buffer size of that variable buffer size descriptor with the lengths of the other variable buffer sizes of the variable buffer size descriptors that have been fetched for the descriptor list and corresponding queue. The byte lengths may be tracked on a per linked-list (e.g., per descriptor list and per queue) basis.

In block 912, main linked lists 514 is capable of determining whether a sufficient number of descriptors have been added to the linked list corresponding to the particular data packet to be processed (e.g., as determined from the particular descriptor request event that was received for the data packet being processed). For example, main linked lists 514 is capable of determining whether the byte length for the queue corresponding to the data packet to be processed, as determined in block 910, is large enough, e.g., is greater than or equal to, the size of the data packet to be processed as specified by the descriptor request event. In general, in response to determining that a sufficient number of variable buffer size descriptors are available (e.g., the byte length determined for the queue corresponding to the data packet being processed is greater than or equal to the size of the data packet), main linked lists 514 determines that sufficient descriptors are available to process the data packet. In that case, method 900 continues to block 916.

In one aspect, only in response to determining that sufficient descriptors are available in the linked list corresponding to the queue for the received data packet will main linked lists 514 continue to block 916 to dequeue the descriptors from the linked list to process the data packet. Without checking for a sufficient number of descriptors prior to dequeuing descriptors for packet processing, additional circuit architecture would be necessary to handle situations in which the system runs out of descriptors. In such cases, additional circuitry may be required to re-queue any descriptors that were dequeued and do so only after determining that there were insufficient descriptors for processing the data packet.

In response to determining that an insufficient number of variable buffer size descriptors are available, method 900 continues to block 914. In block 914, the payload, e.g., data packet, may be dropped and no DMA write operation is performed for the data packet. In that case, descriptor prefetch 302 may notify DMA write circuit 304 of the condition. DMA write circuit 304 may notify the client circuit that the data was dropped. In this scenario, descriptors that were prefetched may be used for subsequent data packets or may be evicted from prefetch cache 504 to make room for other data traffic. In this case, the dropping of data implements the expected behavior for a Network Interface Card (NIC) in situations where the host system has not provided a sufficient number of descriptors to move the data.

In block 916, descriptor prefetch 302 processes the data packet. For example, main linked lists 514 processes the data packet and, in doing so, consumes a number of descriptors. For example, main linked lists 514 dequeues descriptors and sends the dequeued descriptors to DMA write circuit 304. In block 918, main linked lists 514 determines the particular number of prefetched descriptors that were consumed in processing the data packet.

In block 920, having determined the number of prefetched descriptors consumed to process the data packet, descriptor prefetch 302 prefetches a number of descriptors that is equal to the number of prefetched descriptors determined to have been consumed in block 918. For example, main linked lists 514 may determine the number of prefetched descriptors consumed and instruct prefetch credit circuit 502 to issue credit in an amount that causes fetch circuit 216 to fetch that number of descriptors. Main linked lists 514 receives the descriptors and stores the descriptors in a linked list in memory therein. Block 920 replaces the number of prefetched descriptors consumed to maintain a constant number of prefetched descriptors available for processing data in prefetch cache 504.

Though not shown, method 900 iterate to continue processing further data that may have been received. For example, method 900 may loop back to block 906 to continue processing further data packets. As discussed, the specified number of prefetched descriptors may be programmable. The number of prefetched descriptors is maintained (e.g., held constant) during operation of DMA system 154 to accommodate for the inability to know a priori how many descriptors are required to process a given packet.

In one or more other example implementations, main linked lists 514 is configured to support a low latency mode. The low latency mode may be used in cases where DMA system 154 can determine with certainty that a given data packet can be processed using a single descriptor despite operating in an environment in which variable buffer size descriptors are also used. The low latency mode may be activated in descriptor prefetch 302 on a per queue basis. For example, the variable buffer size descriptor mode may be used for particular queues while the low latency mode is used for other queues. In one or more examples, operation of descriptor prefetch 302 may dynamically switch between the low latency mode described hereinbelow and the variable buffer size descriptor mode that processes variable buffer size descriptors.

Figure 10:
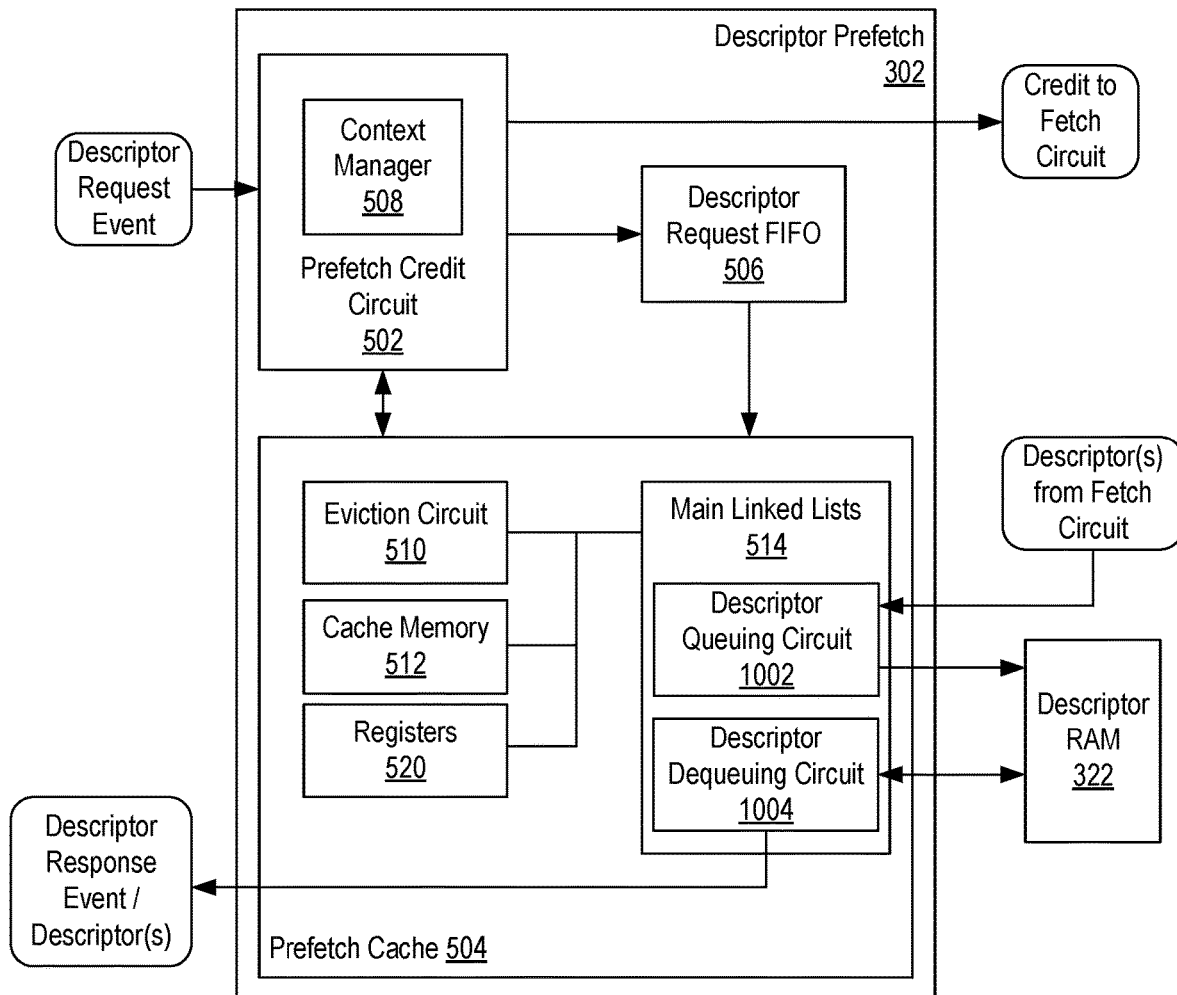
FIG. 10 illustrates an example implementation of a descriptor prefetch circuit including a main linked list adapted to implement different operating modes for processing data packets.

FIG. 10 illustrates another example implementation of descriptor prefetch 302 including an implementation of main linked lists 514 adapted to implement different operating modes for processing data packets. In the example of FIG. 10, descriptor prefetch 302 is substantially similar to the example implementation of FIG. 5. In the example of FIG. 10, main linked lists 514 includes a descriptor queueing circuit 1002 and a descriptor dequeuing circuit 1004.

In the example, descriptor queueing circuit 1002 is capable of receiving descriptors from fetch circuit 216 and queueing the received descriptors. That is, descriptor queueing circuit 1002 is capable of adding a record of the received descriptor to a linked list corresponding to the queue to which the received descriptor belongs and storing the descriptor in descriptor RAM 322. Descriptor dequeuing circuit 1004 is capable of dequeuing descriptors by reading descriptors from descriptor RAM 322, removing the reference of the descriptor from the linked list stored in main linked lists 514, and outputting the descriptor(s) read from descriptor RAM 322.

In general, descriptor queueing circuit 1002 and descriptor dequeuing circuit 1004 are capable of evaluating descriptors as queued and as dequeued on a per queue basis to determine whether to implement low latency mode. Low latency mode may be used in cases where DMA system 154 is certain that a received data packet may be processed using a single descriptor (e.g., the data packet is a "single-descriptor packet"). In general, as descriptors are added to the linked list for the queue and the descriptors stored in descriptor RAM 322, the length of the buffer specified by the linked list for the queue is compared against a configurable threshold length. The threshold length may be specified in registers 520. The threshold length may be a user-specified threshold length. In general, as long as all buffer length specified by each individual descriptor of a same queue (e.g., each descript of the linked list of main linked lists 514 for the queue) is above the threshold length, the low latency mode may be enabled for the queue.

Listing 2 below shows example pseudo code illustrating the operational behavior of main linked lists 514 and, more particularly, of descriptor queueing circuit 1002 to dynamically implement low latency mode.

| Listing 2 |
|---|
| if (in_length < threshold)<br>   low_latency_mode = 0;<br>else<br>   low_latency_mode = 1; |

Referring to Listing 2, descriptor queueing circuit 1002 is configured to evaluate each received descriptor by comparing the length of the buffer specified by the descriptor with a threshold length. In response to determining that the length of the buffer specified by the descriptor is less than the threshold length, descriptor queueing circuit 1002 determines that the low latency mode for the particular queue (e.g., corresponding linked list) to which the received descriptor belongs is not active (e.g., off). In response to determining that the length of the buffer specified by the descriptor is not less than the threshold length (e.g., is greater than or equal to the threshold length), descriptor queueing circuit 1002 determines that the low latency mode for the queue (e.g., corresponding linked list) to which the descriptor belongs is active or on.

Listing 3 below shows example pseudo code illustrating the operational behavior of main linked lists 514 and, more particularly, of descriptor dequeuing circuit 1004 to dynamically implement low latency mode.

| Listing 3 |
|---|
| if (packet_len < threshold && low_latency_mode == 1)<br>   // dequeue 1 descriptor<br>else<br>   // dequeue iteratively to satisfy packet_len |

Descriptor dequeuing circuit 1004 is configured to respond to dequeuing requests by implementing the operations illustrated in Listing 3. In response to a received dequeue request, descriptor dequeuing circuit 1004 compares the length of the data packet (e.g., the length of the data packet to be handled and specified by the received dequeuing request) against the threshold length described with reference to descriptor queueing circuit 1002. In response to determining that the length of the data packet is less than the threshold length and that the low latency mode is enabled for the queue (e.g., also specified by the dequeuing request), descriptor dequeuing circuit 1004 performs the dequeuing as requested using the low latency mode. The conditions described guarantee that only one descriptor is needed to satisfy the data packet. In the low latency mode, which is effectively a fixed-size buffer mode, the data packet can be processed with reduced latency (e.g., in fewer clock cycles such as in 2 clock cycles or 1 clock cycle in some embodiments). In the low latency mode, the additional administration previously described to handle variable buffer size descriptors (e.g., that of Listing 1 and FIG. 7) may be skipped or omitted thereby reducing the computational overhead and latency for handling the data packet.

In response to determining that the data packet length specified by the dequeuing request is not less than the threshold length (e.g., is greater than or equal to the threshold length) or some of the descriptors of the linked list for the queue to which the dequeuing request is directed have descriptors that were previously determined to be too small (e.g., low latency mode was not enabled for the queue by descriptor queueing circuit 1002), low latency mode is disabled for the queue. Accordingly, in processing each packet for the queue, the previously described operations for tracking the total buffer sizes compared to the size of the data packet to be processed (e.g., Listing 1) are performed thereby incurring additional latency. This additional latency, however, still provides acceptable performance given the large size of the data packets handled. Further, the ability to switch in and out of the low latency mode as described allows the prefetch cache 504 to selectively engage the low latency mode for improved performance in a dynamic way that is data dependent.

Figures 11A, 11B:
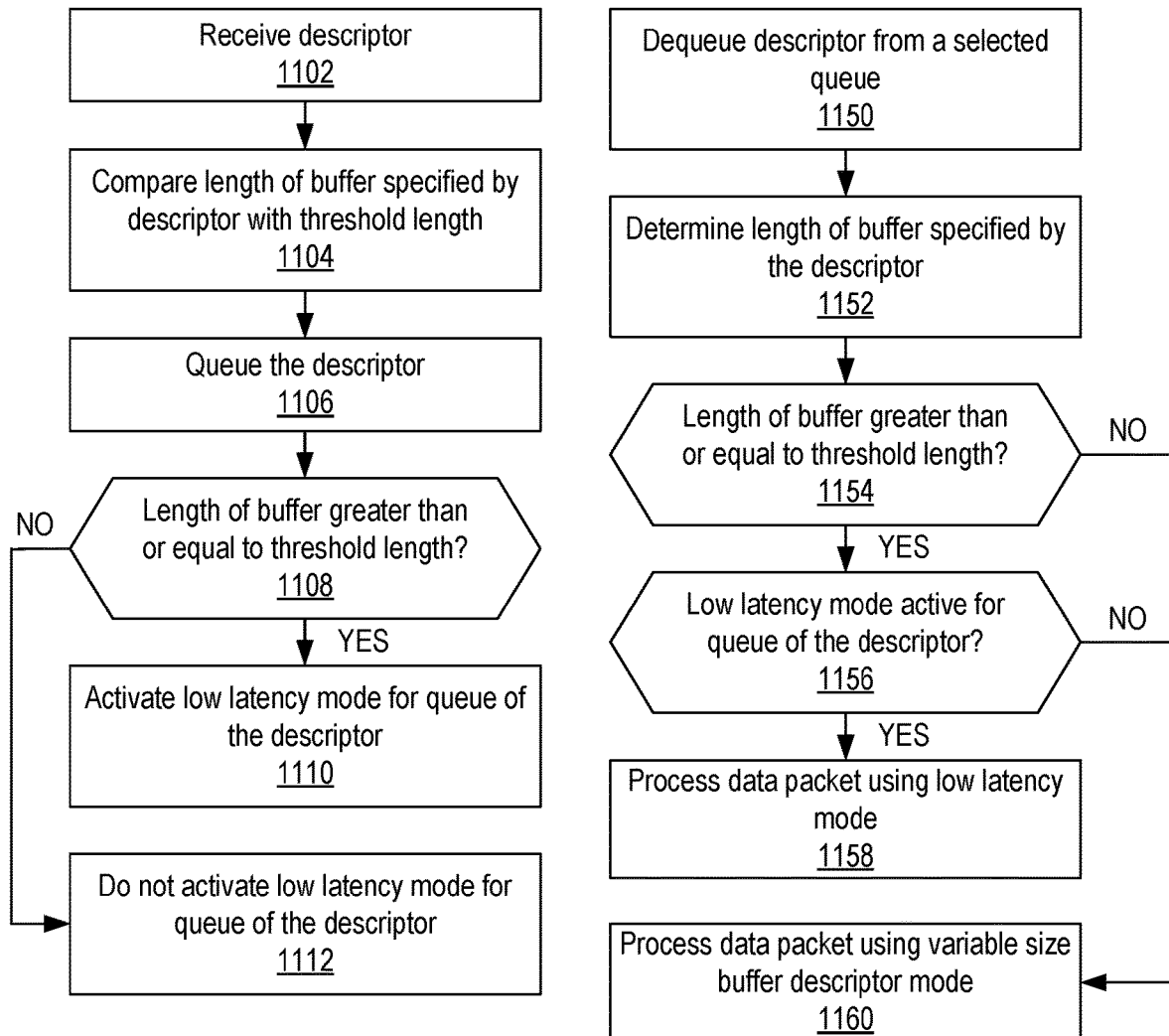
FIGS. 11A and 11B, taken collectively, illustrate an example method of dynamically switching between different operating modes for processing data packets.

FIGS. 11A and 11B, taken collectively, illustrate an example method of dynamically switching between different operating modes for processing data packets. Referring to FIG. 11A, in block 1102 main linked lists 514 and, more particularly, descriptor queueing circuit 1002, receives a descriptor. In block 1104, descriptor queueing circuit 1002 compares a length of the buffer specified by the received descriptor with a threshold length. The threshold length may be a predetermined length. In one aspect, the threshold length is programmable (e.g., user programmable). For example, the threshold length may be specified in registers 520.

In block 1106, descriptor queueing circuit 1002 queues the descriptor. For example, descriptor queueing circuit 1002 is capable of storing the descriptor in descriptor RAM 322 and adding a description of the descriptor (e.g., a pointer) to a linked list corresponding to the queue of the descriptor.

In block 1108, descriptor queueing circuit 1002 determines whether the length of the buffer is greater than or equal to the threshold length. In response to determining that the length of the buffer is greater than or equal to the threshold length, the method continues to block 1110. In block 1110, descriptor queueing circuit 1002 activates the low latency mode of the queue of the descriptor. In response to determining that the length of the buffer is less than the threshold length, the method continues to block 1112. In block 1112, descriptor queueing circuit 1002 does not activate the low latency mode for the queue of the descriptor. The method illustrated in FIG. 11A ensures that, for any queue, the low latency mode is activated only if each descriptor of that queue specifies a buffer having a size that is greater than or equal to the threshold size (e.g., length).

Referring to FIG. 11B, in block 1150, descriptor dequeuing circuit 1004 dequeues a descriptor for a selected queue. For example, a dequeue request may be received in response to which descriptor dequeuing circuit 1004 performs the dequeuing operation. The dequeuing operation may include removing the descriptor from the linked list for the selected queue maintained in main linked lists 514 and reading the descriptor from descriptor RAM 322.

In block 1152, descriptor dequeuing circuit 1004 is capable of determining a length of the buffer specified by the descriptor dequeued in block 1150. In block 1154, descriptor dequeuing circuit 1004 determines whether the length of the buffer specified by the descriptor is greater than or equal to the threshold length. In response to determining that the length of the buffer is greater than or equal to the threshold length, the method continues to block 1156. Otherwise, the method continues to block 1160.

In block 1156, descriptor dequeuing circuit 1004 determines whether low latency mode has been activated for the queue (e.g., linked list) of the descriptor. In response to determining that low latency mode has been activated for the queue of the descriptor, the method continues to block 1158. Otherwise, the method proceeds to block 1160.

In block 1158, the data packet is processed using the low latency mode. In the low latency mode, tracking of the cumulative buffer space for a plurality of variable size buffer descriptors to determine whether the variable buffer size descriptors satisfy the data packet is not required. In block 1160, the data packet is processed using the variable size buffer descriptor mode.

FIG. 11B illustrates that the two conditions of having low latency mode activated for the subject queue and the length of the buffer being greater than or equal to the threshold length must be met to process a data packet using low latency mode. Further, FIG. 11B illustrates that whether low latency mode is used can be determined on a per queue (e.g., linked list) basis dynamically during operation of the DMA system 154.

In one or more examples, once low latency mode is turned off for a given queue, low latency mode will remain off for that queue until the linked list corresponding to the queue is evicted and later newly created or is empty. For example, once a descriptor having a size below the minimum threshold has been added to the linked list, the low latency mode is disabled for that queue until the linked list is evicted and all descriptors for that specific queue are flushed. Once a queue operates outside of the performance guidelines described herein, there is no need to quickly recover the queue to operate in low-latency mode since an accurate prediction as to whether small descriptors will continue to be received for the queue cannot be made.

Figure 12:
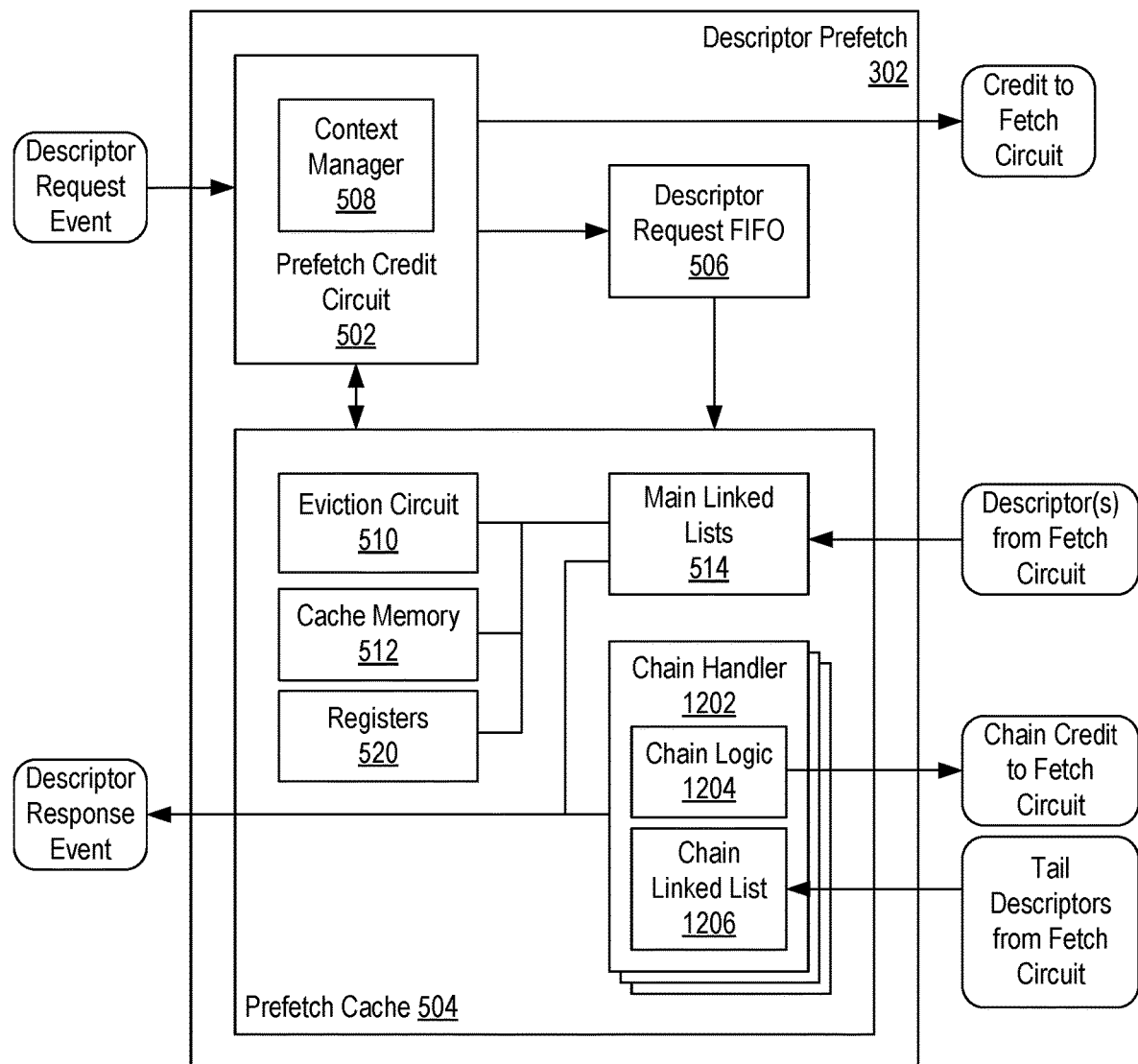
FIG. 12 illustrates another example implementation of the descriptor prefetch circuit of FIG. 3.

FIG. 12 illustrates another example implementation of descriptor prefetch 302. For purposes of illustration, some components of prefetch cache 504 have been omitted (e.g., descriptor queueing circuit 1002 and descriptor dequeuing circuit 1004).

In the example of FIG. 12, prefetch cache 504 includes one or more chain handlers 1202. Each chain handler 1202 may include a chain logic circuit 1204 and chain linked list circuit 1206. In one or more example implementations, prefetch cache 504 includes a plurality of chain handlers 1202. For example, prefetch cache 504 may include 64 different chain handlers 1202. It should be appreciated that the particular number of chain handlers specified is for purposes of illustration only and is not intended as a limitation. Prefetch cache 504 may include fewer or more chain handlers 1202 than described.

In the example of FIG. 12, main linked lists 514 is configured to receive descriptors from fetch circuit 216. Main linked lists 514 is capable of dequeuing a descriptor from the memory included therein and evaluating whether the dequeued descriptor is a head descriptor of a chain descriptor. In response to determining that the descriptor is a head descriptor, main linked lists 514 notifies chain handler 1202 (e.g., chain logic circuit 1204 therein) to begin processing tail descriptors of the particular descriptor table to which the head descriptor points. In this manner, main linked lists 514 effectively offloads processing of the remainder of the chain descriptor. As such, main linked lists 514 may continue processing further descriptors from the linked list(s) stored in memory therein by dequeuing a further descriptor for processing as previously described.

The number of chain handlers 1202 dictates the number of chain descriptors that may be processed in parallel. For purposes of illustration and not limitation, with 64 chain handlers 1202 included in prefetch cache 504, 64 different chain descriptors may be processed concurrently, e.g., in parallel.

Figure 13:
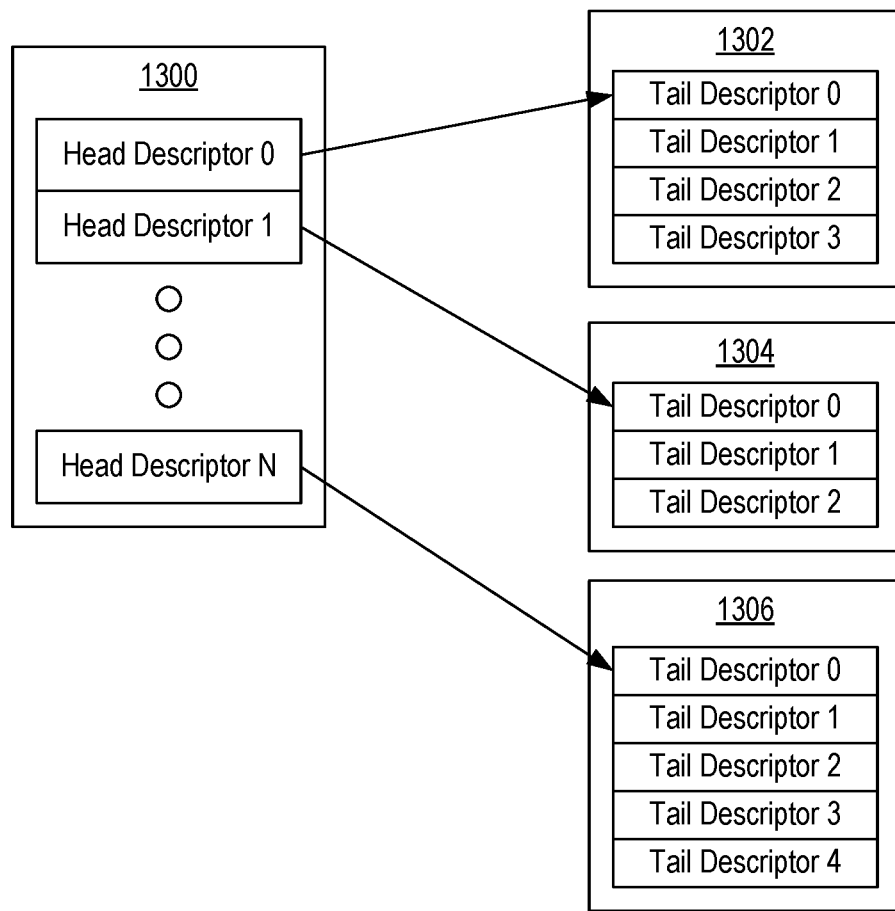
FIG. 13 illustrates an example of chain descriptors as processed by the descriptor prefetch circuit of FIG. 12.

FIG. 13 illustrates an example of chain descriptors as processed by descriptor prefetch 302 of FIG. 12. Within this disclosure, the term "chain descriptor" means a head descriptor and one or more tail descriptors. In the example of FIG. 13, index ring 1300 includes a plurality of head descriptors 0, 1, through N. Index ring 1300 may be stored in host memory (in memory 104, e.g., as part of descriptor queues 114). In one or more example implementations, each of the descriptors stored in index ring 1300 is a head descriptor. In one or more other example implementations, the descriptors stored in index ring 1300 may include head descriptors and normal descriptors (e.g., non-head or non-chain descriptors). Each head descriptor includes a "next flag" that is set to indicate that the head descriptor points to another descriptor that is part of the chain descriptor.

In the example of FIG. 13, each head descriptor points to a first tail descriptor disposed in a descriptor table. Tail descriptors are stored in descriptor tables that exist as separate and distinct data structures than index ring 1300. Like index ring 1300, descriptor tables are stored in host memory (memory 104, e.g., as part of descriptor queues 114). In the example, head descriptor 0 points to tail descriptor 0 of descriptor table 1302. Head descriptor 1 points to tail descriptor 0 of descriptor table 1304. Head descriptor N points to tail descriptor 0 of descriptor table 1306. In the example, descriptor tables 1302, 1304, and 1306 include different numbers of tail descriptors. In other examples, each of descriptor tables 1302, 1304, and 1306 may include a same number of descriptors.

Like the head descriptors, each tail descriptor includes a "next flag." The next flag, when set, indicates that another tail descriptor exists in the descriptor table. The last descriptor of a descriptor table (e.g., tail descriptor 3 of descriptor table 1302) includes a next flag that is not set, which indicates the "last" status of the tail descriptor.

Figure 14:
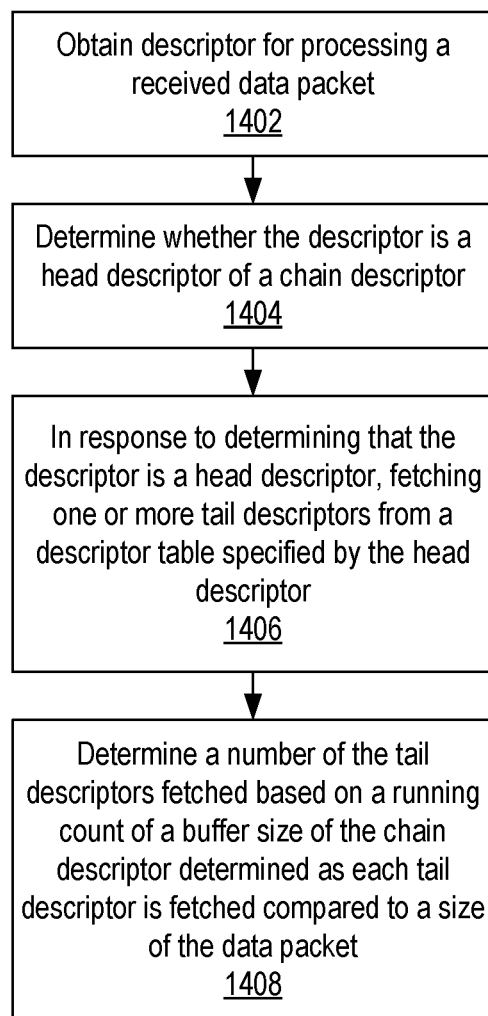
FIG. 14 illustrates an example method of direct descriptor handling using chain descriptors.

FIG. 14 illustrates an example method 1400 of direct descriptor handling using chain descriptors. Method 1400 illustrates a general or high-level example of descriptor handling using chain descriptors. Method 1400 may begin in block 1402 where main linked lists 514 obtains a descriptor. For example, main linked lists 514 is capable of dequeuing a descriptor from a linked list stored in memory therein. The obtained or dequeued descriptor is for a data packet received by the DMA system 154. In block 1404, main linked lists 514 determines whether the descriptor is a head descriptor of a chain descriptor.

In block 1406, in response to determining that the descriptor is a head descriptor, chain handler 1202 fetches one or more tail descriptors from a descriptor table specified by the head descriptor. As an illustrative and non-limiting example, in block 1406, in response to determining that the descriptor is a head descriptor, chain handler 1202 is capable of fetching the next tail descriptor using the descriptor chain index specified by the head descriptor. One descriptor may be fetched at a time. In response to receiving the next descriptor, a "next flag" of the fetched descriptor is evaluated to determine whether the fetched descriptor is the end of the chain. If not, the next tail descriptor is fetched, and so forth. Tail descriptors may be fetched one-by-one in this manner. Further details regarding the use of chain descriptors are provided in connection with FIG. 15 below.

In block 1408, chain handler 1202 (e.g., chain logic circuit 1204) determines a number of tail descriptors fetched in block 1406 based on a running count of a buffer size of the chain descriptor determined as each tail descriptor is fetched compared to a size of the data packet.

Figure 15:
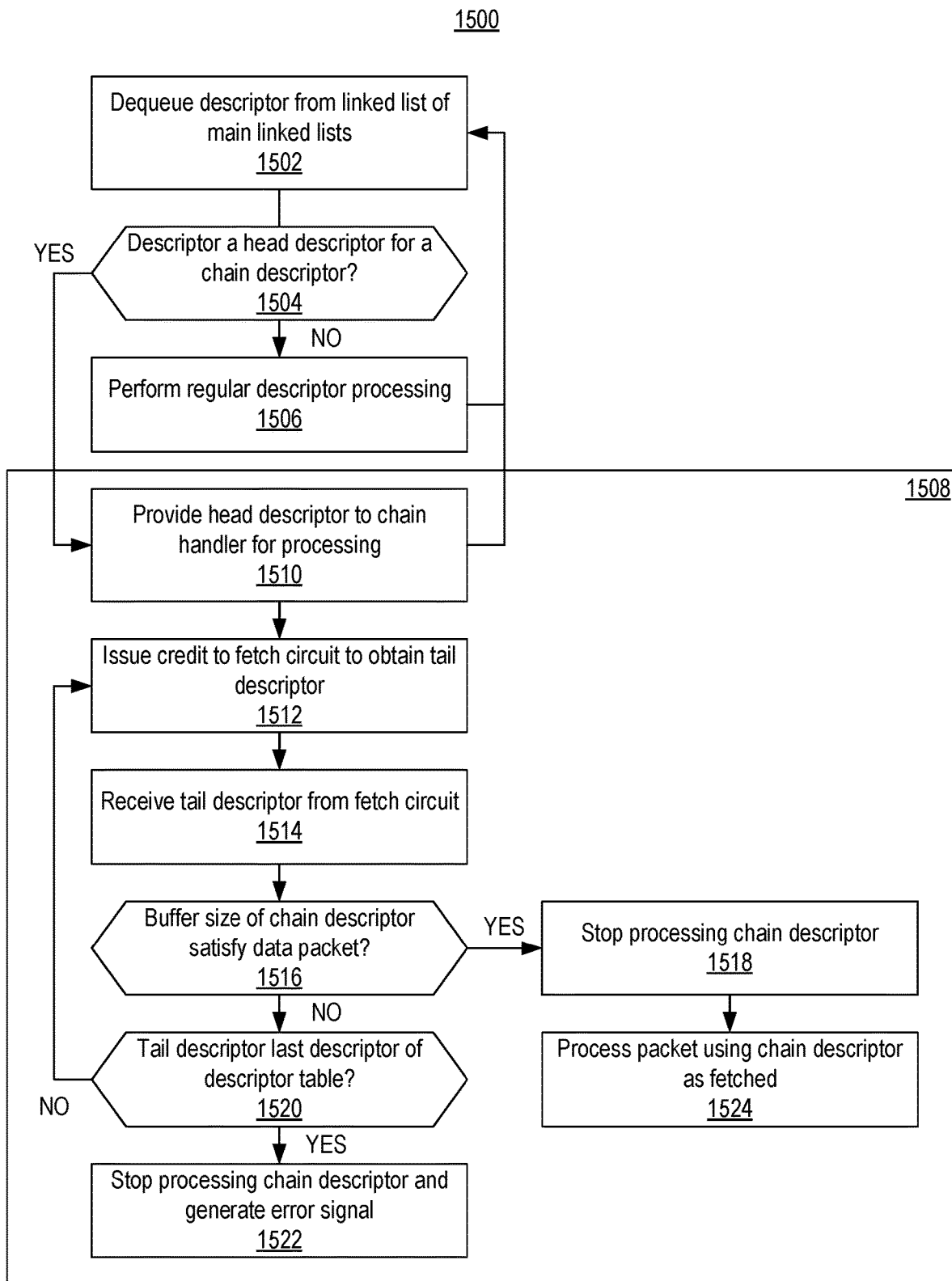
FIG. 15 illustrates another example method of direct descriptor handling using chain descriptors.

FIG. 15 illustrates another example method 1500 of direct descriptor handling using chain descriptors. Method 1500 illustrates a more detailed example of descriptor handling using chain descriptors than that illustrated in FIG. 14. Method 1500 may begin in block 1502 where main linked lists 514 dequeues a descriptor from memory therein for processing a data packet received by DMA write circuit 304. For example, main linked lists 514 dequeues a descriptor from a linked list in memory therein.

In block 1504, main linked lists 514 determines whether the descriptor is a head descriptor of a chain descriptor or a normal (e.g., a single) descriptor. For example, main linked lists 514 is capable of determining whether a "next flag" of the descriptor indicates that the descriptor is the last. A descriptor dequeued from main linked lists 514 with a next flag that is not set indicates that the descriptor is the last and cannot be a head descriptor. The descriptor is a "normal" or single descriptor that is not part of a chain descriptor in that the descriptor does not point to a descriptor table including one or more tail descriptors. A descriptor with a next flag that is set indicates that the descriptor is not last and is a head descriptor. The descriptor is the head descriptor of a chain descriptor and points to a descriptor table including one or more tail descriptors of the chain descriptor. In other examples, head descriptors may be differentiated from non-head descriptors by way of other identifying information in the descriptor beyond the "next flag" described.

In response to determining that the descriptor dequeued in block 1502 is not a head descriptor, method 1500 continues to block 1506. In block 1506, the descriptor is processed as a normal descriptor (e.g., a non-head or non-chain descriptor). After block 1506, method 1500 may loop back to block 1502 to dequeue and process a next descriptor.

In response to determining that the descriptor is a head descriptor, method 1500 begins chain descriptor processing illustrated as block 1508 and continues to block 1510. It should be appreciated that main linked lists 514 may continue to offload head descriptors as received as long as a chain handler 1202 is available to facilitate parallel fetching and/or processing of descriptors. Thus, each chain handler 1202 is capable of operating on a different chain descriptor in parallel, e.g., concurrently, as described herein. In block 1510, main linked lists 514 provides the head descriptor to chain handler 1202. For example, main linked lists 514 may provide the head descriptor to chain logic circuit 1204. Chain logic circuit 1204, in block 1512 and in response to receiving the head descriptor, issues credit to fetch circuit 216. Fetch circuit 216 fetches the tail descriptor to which the head descriptor points. In block 1514, chain linked list circuit 1206 receives the tail descriptor as fetched from fetch circuit 216.

In block 1516, chain handler 1202 determines whether the size of the buffer of the chain descriptor, as fetched so far, satisfies the data packet. That is, chain handler 1202 and, more particularly, chain logic circuit 1204, determines whether the total length of the buffer as determined by summing the length of the buffer specified by the head descriptor and the length of the buffer specified by each of the fetched tail descriptors of the same chain descriptor as the head descriptor is greater than or equal to a length of the data packet.

In response to determining that the length of the total chain descriptor satisfies the data packet (e.g., the length of the buffer of the chain descriptor meets or exceeds the length of the data packet), method 1500 continues to block 1518, where prefetch cache 504 may stop processing the chain descriptor. For example, in response to each tail descriptor fetched, chain logic circuit 1204 determines whether the running count of the buffer size of the chain descriptor satisfies the size of the data packet.

In response to determining that the running count of the buffer size of the chain descriptor including the most recently fetched tail descriptor does satisfy the size of the data packet, chain logic circuit 1204 discontinues fetching of the tail descriptors from the descriptor table. For example, chain logic circuit 1204 stops issuing credit to fetch circuit 216. In block 1524, the packet may be processed (e.g., DMA transferred) using the chain descriptor (e.g., the head descriptor and the fetched tail descriptors) as fetched.

In response to determining that the length of the total chain descriptor does not satisfy the data packet (e.g., the length of the buffer of the chain descriptor does not exceed the length of the data packet), method 1500 continues to block 1520. For example, in response to each tail descriptor fetched, chain logic circuit 1204 determines whether the running count of the buffer size of the chain descriptor satisfies the size of the data packet. In response to determining that the running count of the buffer size of the chain descriptor including the most recently fetched tail descriptor does not satisfy the size of the data packet, method 1500 continues to block 1520.

In block 1520, chain handler 1202 determines whether the tail descriptor just fetched (e.g., received in block 1514) is the last tail descriptor of the descriptor table. In one aspect, chain logic circuit 1204 evaluates the next flag of the tail descriptor to determine whether the tail descriptor is the last tail descriptor of the descriptor table. In response to determining that the tail descriptor is not the last descriptor of the descriptor table, method 1500 loops back to block 1512 to obtain a further tail descriptor for the chain descriptor. For example, chain logic circuit 1204 fetches a next tail descriptor from the descriptor table. That is, chain logic circuit 1204 issues further credit to fetch circuit 216 to fetch the next tail descriptor.

In response to determining that the tail descriptor is the last tail descriptor of the descriptor table, method 1500 continues to block 1522. In block 1522, DMA system 154 stops processing the chain descriptor and generates an error signal. That is, in block 1522, chain logic circuit 1204 determines that the tail descriptor is a last tail descriptor of the descriptor table and that the running count of the buffer size of the chain descriptor including the last tail descriptor does not satisfy the size of the data packet. Accordingly, chain logic circuit 1204 generates an error signal.

The example of FIG. 15 illustrates the hand-off of fetch operations for tail descriptors from main linked lists 514 to one or more chain handlers 1202. Main linked lists 514 is capable of handing off fetch operations of the one or more tail descriptors to one or more different chain handlers 1202, each configured to fetch tail descriptors. This allows main linked lists 514 to obtain a next descriptor for processing a further data packet and continue the evaluation of whether that next data packet is a head packet independently of the fetching of tail descriptors. The obtaining of the next descriptor is performed concurrently with the fetch operations of the one or more tail descriptors by the chain handler. That is, operation of main linked lists 514 may occur concurrently and in parallel with operation of the one or more chain handlers 1202. Thus, a plurality of tail descriptors may be fetched in parallel using the plurality of chain handlers 1202 while main linked lists 514 obtains further descriptors for processing further data packets concurrently with operation of the chain handlers 1202.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "data processing system" means one or more hardware systems configured to process data, each hardware system including at least one hardware processor and memory. The hardware processor is programmed with computer-readable instructions that, upon execution, initiate operations.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the terms "computer-readable program code," "computer readable program instructions," "program code," and "program instructions" are used interchangeably. Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of descriptor fetch for a direct memory access system, the method comprising:
    obtaining a descriptor for processing a received data packet;
    determining whether the descriptor is a head descriptor of a chain descriptor;
    in response to determining that the descriptor is a head descriptor, fetching one or more tail descriptors from a descriptor table specified by the head descriptor; and
    determining a number of the tail descriptors fetched based on a running count of a buffer size of the chain descriptor determined as each tail descriptor is fetched compared to a size of the data packet.

2. The method of claim 1, further comprising:
    in response to each tail descriptor fetched, determining whether the running count of the buffer size of the chain descriptor satisfies the size of the data packet; and
    in response to determining that the running count of the buffer size of the chain descriptor including a most recently fetched tail descriptor does satisfy the size of the data packet, discontinuing fetching of the tail descriptors from the descriptor table.

3. The method of claim 1, further comprising:
    in response to each tail descriptor fetched, determining whether the running count of the buffer size of the chain descriptor satisfies the size of the data packet; and
    in response to determining that the running count of the buffer size of the chain descriptor including a most recently fetched tail descriptor does not satisfy the size of the data packet, fetching a next tail descriptor from the descriptor table.

4. The method of claim 1, further comprising:
    in response to determining that a tail descriptor of the one or more tail descriptors is a last tail descriptor of the descriptor table and that the running count of the buffer size of the chain descriptor including the last tail descriptor does not satisfy the size of the data packet, generating an error signal.

5. The method of claim 1, the method further comprising:
    handing off fetch operations of the one or more tail descriptors from a main linked lists circuit to a chain handler configured to fetch the one or more tail descriptors; and
    obtaining a next descriptor for processing a further data packet;
    wherein the obtaining the next descriptor is performed concurrently with the fetch operations of the one or more tail descriptors by the chain handler.

6. The method of claim 1, wherein the direct memory access system comprises a plurality of chain handlers each configured to fetch tail descriptors from descriptor tables, wherein the method further comprises:
    fetching a plurality of tail descriptors in parallel using the plurality of chain handlers; and
    obtaining further descriptors for processing further data packets concurrently with the fetching the plurality of tail descriptors.

7. The method of claim 1, wherein:
    the descriptors evaluated for being head descriptors are obtained from an index ring stored in a host memory; and
    the descriptor table storing the tail descriptors is stored in the host memory as a distinct data structure from the index ring.

8. A method of descriptor fetch for a direct memory access system of a peripheral device, the method comprising:
    reading, by the direct memory access system of the peripheral device, a plurality of pointers from an index ring buffer stored in a host memory, wherein the plurality of pointers specify a plurality of descriptors of a descriptor table stored in the host memory;
    determining whether the plurality of descriptors are stored in the descriptor table with incremental index locations;
    in response to determining that the plurality of descriptors are stored in the descriptor table with incremental index locations, generating a single read request specifying the plurality of descriptors; and
    issuing the single read request to a host system to fetch the plurality of descriptors.

9. The method of claim 8, wherein the plurality of descriptors having incremental index locations are stored contiguously in the descriptor table.

10. The method of claim 8, wherein the reading is performed in response to a received doorbell request specifying the plurality of pointers.

11. The method of claim 8, wherein the generating the single read request comprises:
    coalescing a plurality of individual read requests corresponding to individual ones of the plurality of descriptors into the single read request.

12. A direct memory access system having a multi-queue stream circuit, the multi-queue stream circuit comprising:
    a descriptor prefetch circuit configured to receive descriptor request events, wherein the descriptor prefetch circuit includes:
        a main linked lists circuit configured to store descriptors in a memory, dequeue descriptors from the memory, and determine whether descriptors, as dequeued, are head descriptors of chain descriptors specifying descriptor tables; and
        a chain handler configured to fetch tail descriptors from the descriptor tables of the chain descriptors based on the descriptors, as dequeued by the main linked lists circuit, determined to be head descriptors;
    wherein the chain handler is configured to operate concurrently with the main linked lists circuit.

13. The direct memory access system of claim 12, wherein the chain handler further comprises:
    a chain logic circuit configured to issue credit to a fetch circuit for fetching the tail descriptors; and
    a chain linked list circuit configured to receive the tail descriptors from the fetch circuit.

14. The direct memory access system of claim 12, wherein a number of the tail descriptors fetched is determined based on a running count of a buffer size of the chain descriptor determined as each tail descriptor is fetched compared to a size of a data packet being processed.

15. The direct memory access system of claim 14, wherein the chain handler further comprises:
   a chain logic circuit configured to determine, for each tail descriptor fetched, whether the running count of the buffer size of the chain descriptor satisfies the size of the data packet;
   wherein the chain logic circuit is configured to, in response to determining that the running count of the buffer size of the chain descriptor including a most recently fetched tail descriptor does not satisfy the size of the data packet, fetch a next tail descriptor from the descriptor table.

16. The direct memory access system of claim 14, wherein the chain handler further comprises:
   a chain logic circuit configured to determine, for each tail descriptor fetched, whether the running count of the buffer size of the chain descriptor satisfies the size of the data packet;
   wherein the chain logic circuit is configured to, in response to determining that the running count of the buffer size of the chain descriptor including a most recently fetched tail descriptor does satisfy the size of the data packet, discontinue fetching of tail descriptors from the descriptor table.

17. The direct memory access system of claim 14, wherein the chain handler further comprises:
   a chain logic circuit configured to, in response to detecting a last tail descriptor of the tail descriptors for a selected descriptor table and determining that the running count of the buffer size of the chain descriptor including the last tail descriptor does not satisfy the size of the data packet, generate an error signal.

18. The direct memory access system of claim 12, wherein:
   the main linked lists circuit is configured to provide each descriptor determined to be a head descriptor to the chain handler for further processing; and
   the main linked lists circuit processes a next descriptor from the memory therein while the chain handler processes the head descriptor received from the main linked lists circuit.

19. The direct memory access system of claim 12, wherein the descriptor prefetch circuit further comprises:
   a plurality of chain handlers each configured to fetch tail descriptors from the descriptor tables of the chain descriptors for the descriptors dequeued by the main linked lists circuit and determined to be head descriptors;
   wherein the main linked lists circuit is configured to provide the descriptors determined to be head descriptors to different ones of the plurality of chain handlers and continue processing further descriptors dequeued from the memory therein concurrently with the plurality of chain handlers processing tail descriptors for the head descriptors received from the main linked lists circuit.

20. The direct memory access system of claim 19, wherein the plurality of chain handlers are configured to operate in parallel with one another and with the main linked lists circuit such that at least two of the plurality of chain handlers operate in parallel fetching tail descriptors.

* * * * *